(12) United States Patent
    Mellor

(10) Patent No.: US 11,352,129 B2
(45) Date of Patent: *Jun. 7, 2022

(54) LEVERED LANDING GEAR WITH INNER SHOCK STRUT

(71) Applicant: The Boeing Company, Chicago, IL (US)

(72) Inventor: Mitchell L. R. Mellor, Bothell, WA (US)

(73) Assignee: The Boeing Company, Chicago, IL (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/829,359

(22) Filed: Mar. 25, 2020

(65) Prior Publication Data

US 2020/0290731 A1    Sep. 17, 2020

Related U.S. Application Data

(63) Continuation of application No. 15/484,646, filed on Apr. 11, 2017, now Pat. No. 10,625,849.

(51) Int. Cl.
| | |
|---|---|
| *B64C 25/20* | (2006.01) |
| *B64C 25/60* | (2006.01) |
| *B64C 25/00* | (2006.01) |
| *B64C 25/34* | (2006.01) |

(Continued)

(52) U.S. Cl.
CPC .............. *B64C 25/20* (2013.01); *B64C 25/34* (2013.01); *B64C 25/60* (2013.01); *F16F 9/18* (2013.01); *F16F 9/3214* (2013.01); *F16F 9/3235* (2013.01); *B64C 2025/008* (2013.01)

(58) Field of Classification Search
CPC ......... B64C 25/14; B64C 25/20; B64C 25/34; B64C 25/60; B64C 2025/008
See application file for complete search history.

(56) References Cited

U.S. PATENT DOCUMENTS 2,256,540 A    9/1941  Armstrong
2,754,072 A *  7/1956  Shapiro .................. B64C 25/14
                                            244/102 SS (Continued)

FOREIGN PATENT DOCUMENTS

EP        0246949        5/1987
EP        2138398        12/2009

(Continued)

OTHER PUBLICATIONS

Mellor, Mitchell, et al.; U.S. Appl. No. 15/444,986, filed Feb. 28, 2017.

(Continued)

*Primary Examiner* — Tye William Abell
(74) *Attorney, Agent, or Firm* — Perman & Green, LLP

(57) ABSTRACT

A levered landing gear including a first shock strut having a first end and a second end, a truck lever pivotally coupled to the second end of the first shock strut, and a second shock strut disposed between the second end of the first shock strut and the truck lever, where the second shock strut has a first end and a second end, the first end of the second shock strut being coupled to the second end of the first shock strut and the second end of the second shock strut being coupled to the truck lever.

20 Claims, 16 Drawing Sheets

(51) Int. Cl.
*F16F 9/18* (2006.01)
*F16F 9/32* (2006.01)

(56) References Cited

U.S. PATENT DOCUMENTS

| | | | | |
|---|---|---|---|---|
| 2,933,271 | A * | 4/1960 | Maltby | B64C 25/001 |
| | | | | 244/103 R |
| 2,967,682 | A * | 1/1961 | Fullam | B64C 25/14 |
| | | | | 244/102 R |
| 4,540,142 | A * | 9/1985 | Veaux | B64C 25/14 |
| | | | | 244/102 R |
| 4,749,152 | A * | 6/1988 | Veaux | B64C 25/60 |
| | | | | 188/321.11 |
| 5,100,083 | A | 3/1992 | Large et al. | |
| 5,299,761 | A | 4/1994 | Robin et al. | |
| 5,429,323 | A | 7/1995 | Derrien et al. | |
| 5,460,340 | A | 10/1995 | White | |
| 5,482,228 | A | 1/1996 | Hoshino | |
| 6,182,925 | B1 | 2/2001 | Kilner et al. | |
| 8,376,272 | B2 | 2/2013 | Bennett et al. | |
| 8,448,900 | B2 | 5/2013 | Mellor et al. | |
| 8,991,753 | B2 | 3/2015 | Mellor et al. | |
| 8,998,133 | B2 | 4/2015 | Cottet | |
| 9,481,452 | B2 * | 11/2016 | Lindahl | B64C 25/22 |
| 9,499,280 | B2 | 11/2016 | Mellor | |
| 2009/0050736 | A1 * | 2/2009 | Bennett | B64C 25/58 |
| | | | | 244/102 R |
| 2009/0321560 | A1 * | 12/2009 | Luce | B64C 25/14 |
| | | | | 244/102 R |
| 2010/0116930 | A1 | 5/2010 | Griffin | |
| 2010/0181423 | A1 * | 7/2010 | Martin | B64C 25/60 |
| | | | | 244/104 FP |
| 2010/0219290 | A1 * | 9/2010 | Luce | B64C 25/14 |
| | | | | 244/102 SL |
| 2010/0288878 | A1 * | 11/2010 | Bennett | B64C 25/34 |
| | | | | 244/104 FP |
| 2011/0233327 | A1 * | 9/2011 | Mellor | B64C 25/20 |
| | | | | 244/102 A |
| 2013/0341457 | A1 | 12/2013 | Wilson | |
| 2017/0253323 | A1 | 9/2017 | Green et al. | |
| 2018/0001998 | A1 | 1/2018 | Bennett | |
| 2018/0162522 | A1 | 6/2018 | Luce | |
| 2018/0208298 | A1 | 7/2018 | Cottet et al. | |
| 2019/0039723 | A1 | 2/2019 | Dubrovsky et al. | |

FOREIGN PATENT DOCUMENTS

| | | |
|---|---|---|
| EP | 2489591 | 8/2012 |
| EP | 3213992 | 9/2017 |
| EP | 3335988 | 6/2018 |
| EP | 3437990 | 2/2019 |
| GB | 184938 | 5/1938 |
| GB | 610698 | 10/1948 |
| GB | 670889 | 4/1952 |
| GB | 1216732 | 12/1970 |
| GB | 2137147 | 10/1984 |
| JP | 38338045 | 12/1996 |
| JP | 2011504829 | 2/2011 |
| JP | 2012111479 | 6/2012 |
| WO | 2006094145 | 9/2006 |
| WO | 2009047367 | 4/2009 |
| WO | 2011119283 | 9/2011 |

OTHER PUBLICATIONS

Cottet, Justin, et al.; U.S. Appl. No. 15/445,652, filed Feb. 28, 2017.
Simpson, Mark, et al.; U.S. Appl. No. 15/445,836, filed Feb. 28, 2017.
Federal Aviation Administration, "Aviation Maintenance Technician Handbook—Airframe, Chapter 13", (2013), downloaded from faa.gov on Aug. 9, 2016.
Currey, Norman S. "Landing Gear Design Handbook". Lockheed-Georgia Company, First Edition, Jan. 1982. Revised Jul. 1984.
Cottet, Justin, et al.; U.S. Appl. No. 15/415,346, filed Jan. 25, 2017.
European Search Report, European Application No. 18173205 dated Jul. 18, 2018.
European Search Report, European Application No. 18155880 dated Jul. 26, 2018.
Japanese Office Action, Japanese Application No. 2018021945 dated Apr. 1, 2019.
European Search Report, European Application No. 19188563, dated Dec. 16, 2019.

* cited by examiner

LEVERED LANDING GEAR WITH INNER SHOCK STRUT

CROSS-REFERENCE TO RELATED APPLICATIONS

This application is a continuation of and claims the benefit of U.S. Non-Provisional patent application Ser. No. 15/484, 646 filed on Apr. 11, 2017 (now U.S. Pat. No. 10,625,849 issued on Apr. 21, 2020), the disclosure of which is incorporated by reference herein in its entirety.

BACKGROUND

1. Field

The exemplary embodiments generally relate to aircraft landing gear systems and aircraft incorporating those landing gear systems and, in particular, to landing gear assemblies that provide the aircraft with increased take off height and increased rotation on takeoff and landing.

2. Brief Description of Related Developments

Levered landing gear and conventional shock struts are known and have been used on aircraft for many years. Generally, conventional shock struts include an outer cylinder and an inner cylinder that move relative to each other. With respect to aircraft, the outer cylinder is coupled to the airframe and the inner cylinder is coupled to a truck or wheel of the landing gear. The relative movement between the inner cylinder and the outer cylinder defines the shock strut stroke.

Aircraft generally include landing gear having the conventional shock struts to facilitate takeoff, landing, and taxi. For takeoff and landing of the aircraft, a taller landing gear is desired to generate a greater angle of rotation (e.g. angle of attack) of the aircraft. The landing gear of some aircraft includes a multi-axle truck beam pivotally coupled to a shock strut at, for example, a distal or lower end of the shock strut to achieve taller takeoff heights; however, multi-axle landing gear increases weight and complexity of the landing gear. The landing gear of other aircraft have single axle landing gear, where additional ground clearance for rotation of the aircraft during takeoff is achieved by increasing the height of landing gear. However, the conventional shock struts generally have a 1:1 ratio between the vertical axle travel provided by the shock strut and the shock strut stroke. As such, conventional shock struts are a limiting factor with respect to the amount of vertical axle travel that can be achieved in levered or levered landing gear.

SUMMARY

The following is a non-exhaustive list of examples, which may or may not be claimed, of the subject matter according to the present disclosure.

One example of the subject matter according to the present disclosure relates to a levered landing gear comprising: a first shock strut having a longitudinal axis; a second shock strut disposed concentrically with the first shock strut along the longitudinal axis such that the first shock strut and the second shock strut extend along a common extension axis; and a truck lever coupled to both the first shock strut and the second shock strut such that the second shock strut pivots the truck lever relative to the first shock strut.

Another example of the subject matter according to the present disclosure relates to an aircraft comprising: a vehicle frame; and a levered landing gear coupled to the airframe, the levered landing gear including a first shock strut having a longitudinal axis, a second shock strut disposed concentrically with the first shock strut along the longitudinal axis such that the first shock strut and the second shock strut extend along a common extension axis, and a truck lever coupled to both the first shock strut and the second shock strut such that the second shock strut pivots the truck lever relative to the first shock strut.

Still another example of the subject matter according to the present disclosure relates to a method of using a levered landing gear, the method comprising: extending a first shock strut and a second shock strut along a common extension axis, wherein the second shock strut is disposed concentrically with the first shock strut along a longitudinal axis of the first shock strut; and pivoting a truck lever relative to the first shock strut as the first shock strut and the second shock strut extend along the common extension axis, where the truck lever is coupled to both the first shock strut and the second shock strut.

Yet another example of the subject matter according to the present disclosure relates to a levered landing gear comprising: a first shock strut having a first end and a second end; a truck lever pivotally coupled to the second end of the first shock strut; and a second shock strut disposed between the second end of the first shock strut and the truck lever, where the second shock strut has a first end and a second end, the first end of the second shock strut being coupled to the second end of the first shock strut and the second end of the second shock strut being coupled to the truck lever.

BRIEF DESCRIPTION OF THE DRAWINGS

Figure 1:
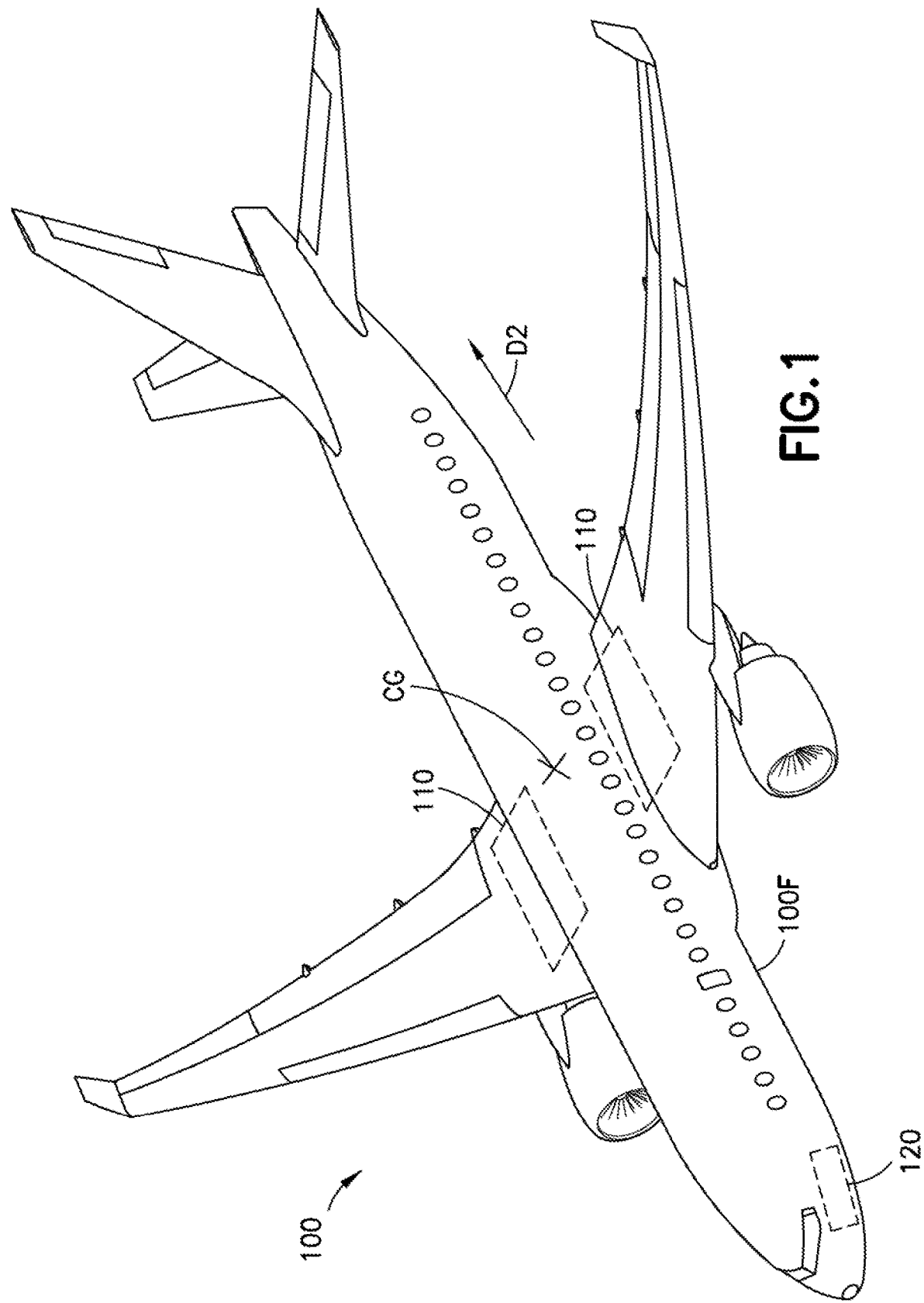
Figure 2A:
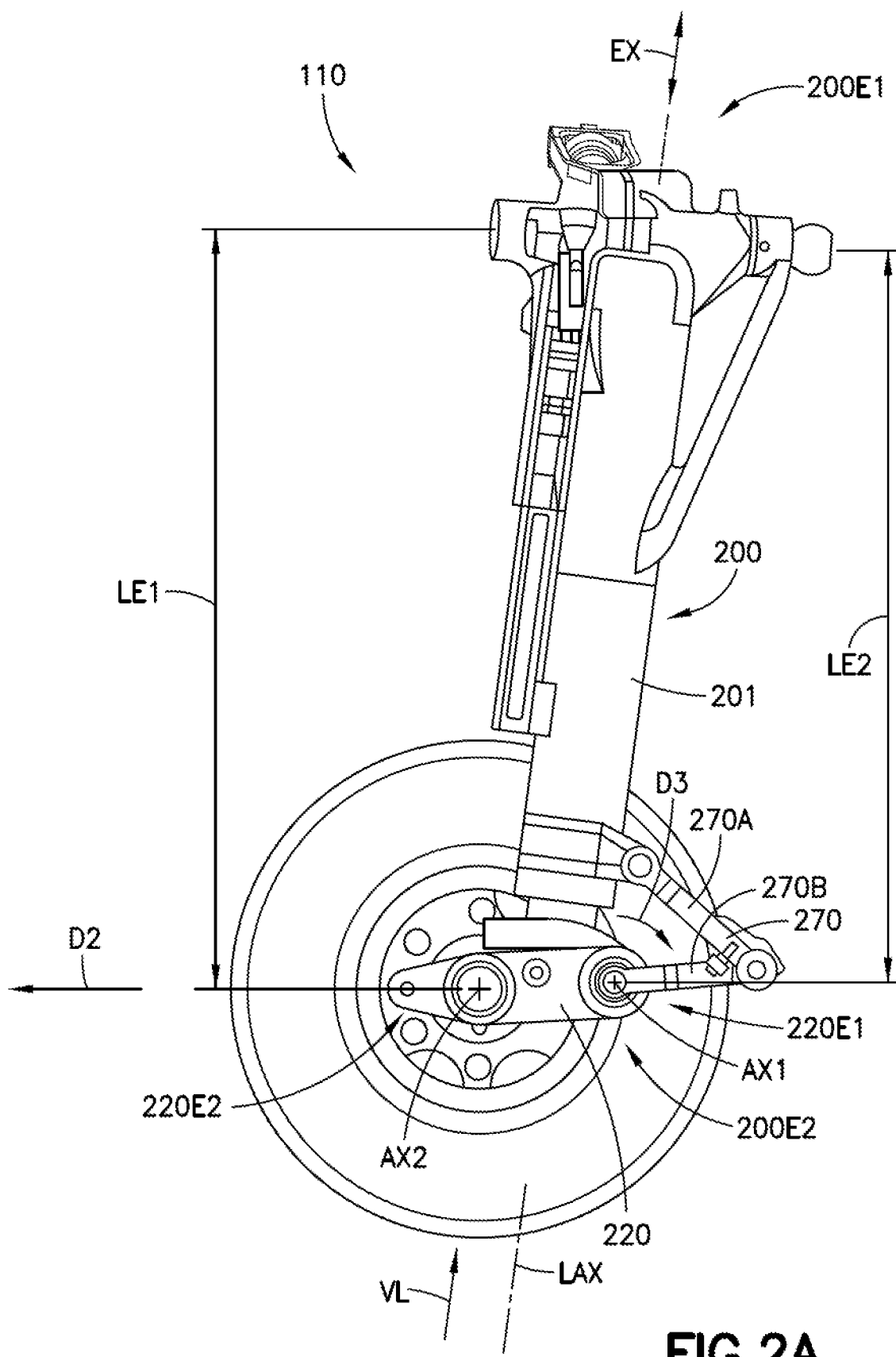
Figure 2B:
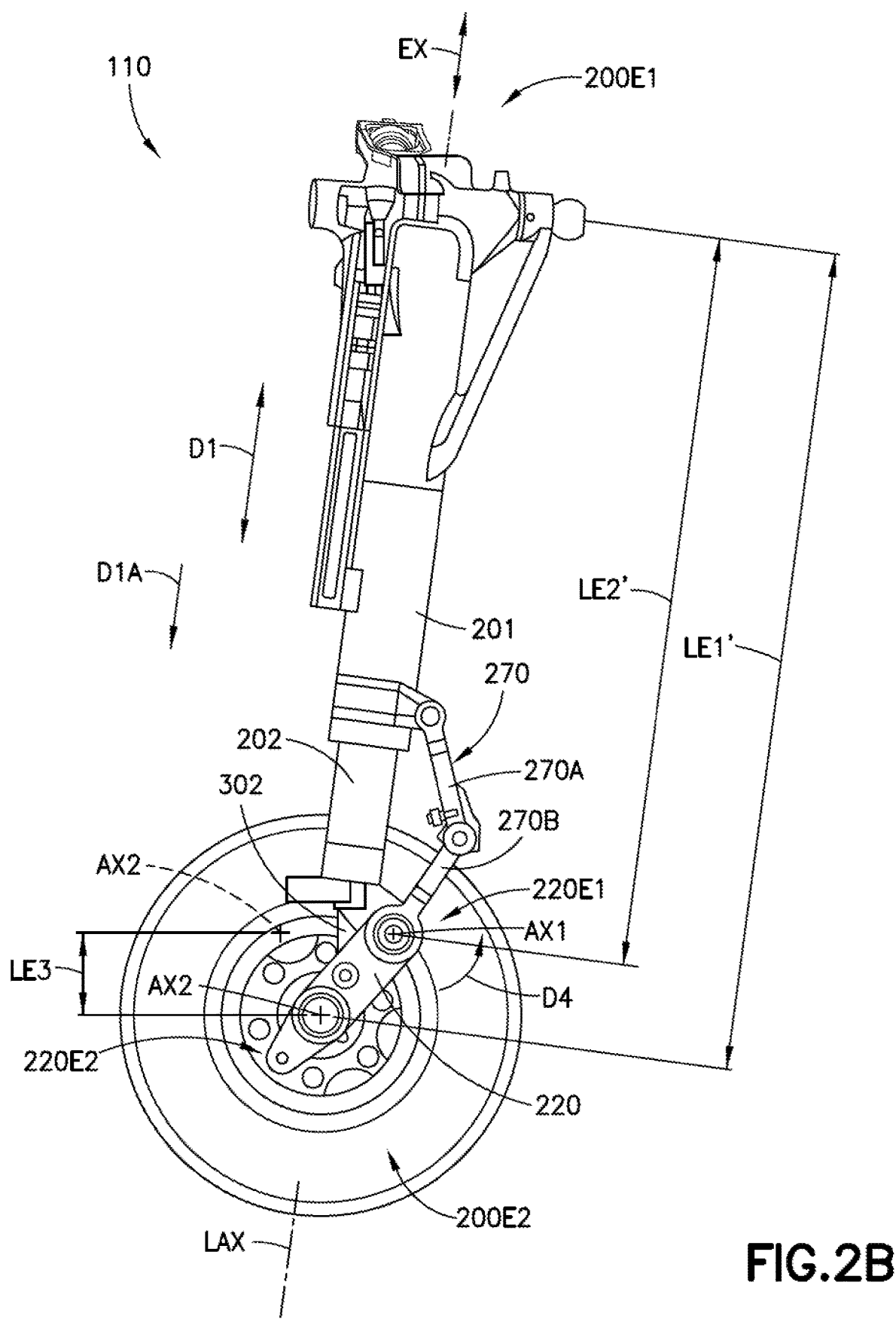
Figure 3A:
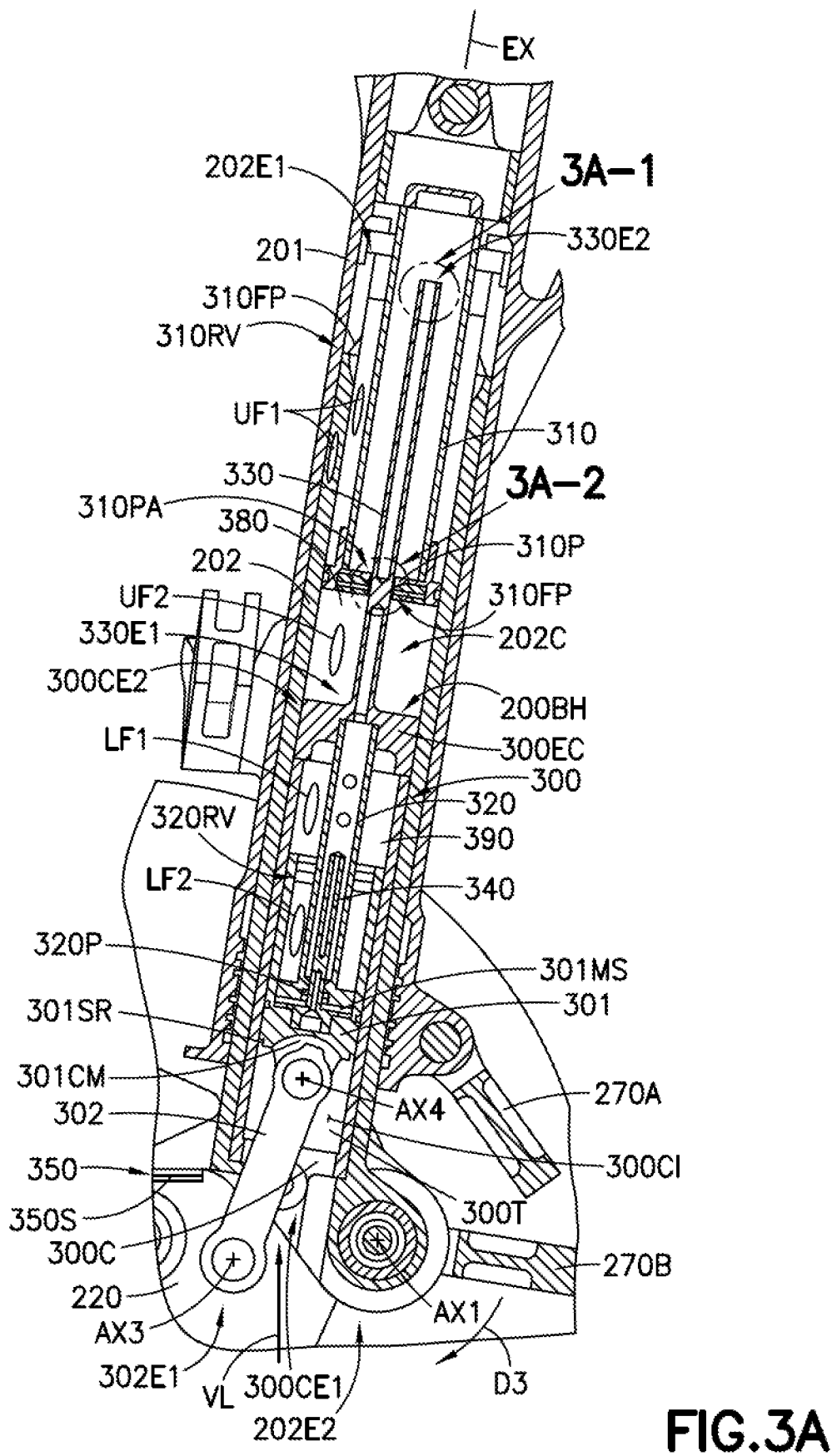
Figures 1, 3A:
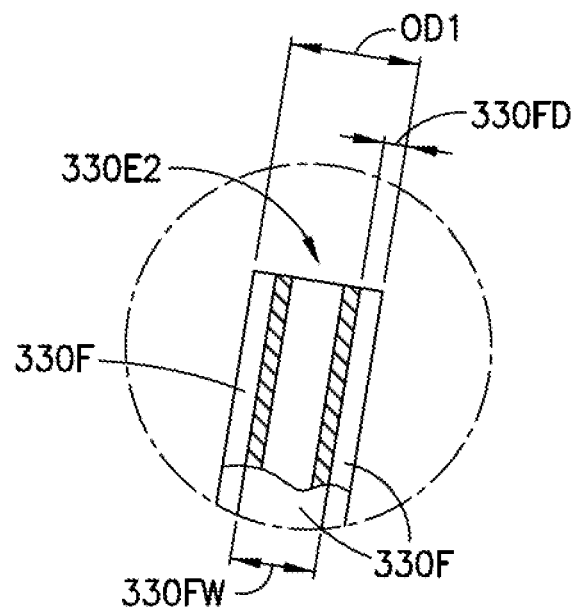
Figures 2, 3A:
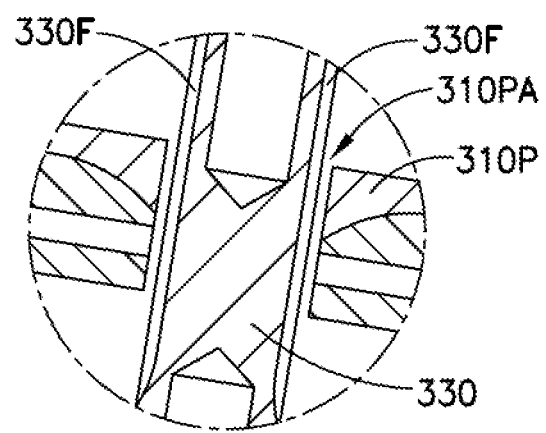
Figure 3B:
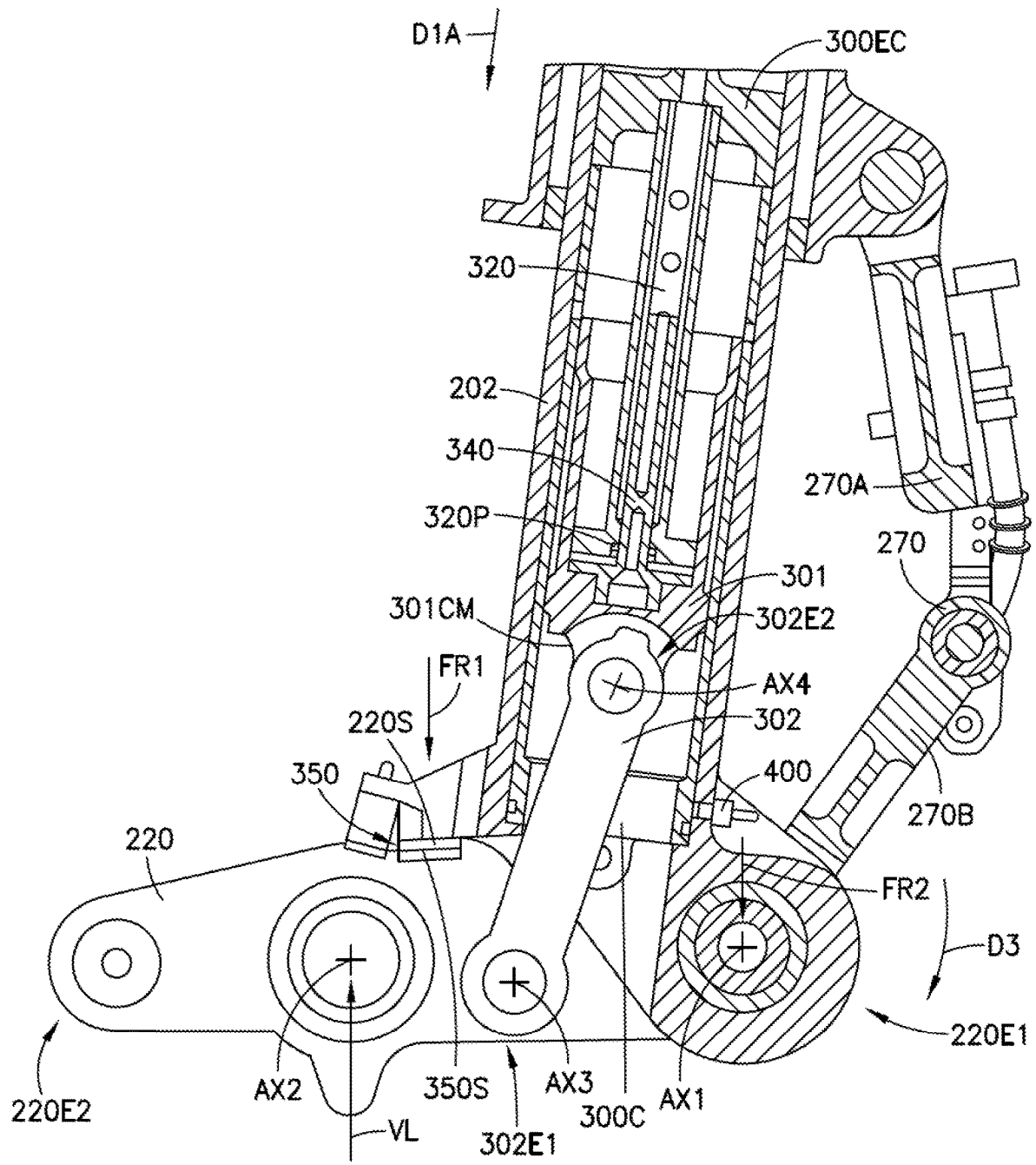
Figure 3C:
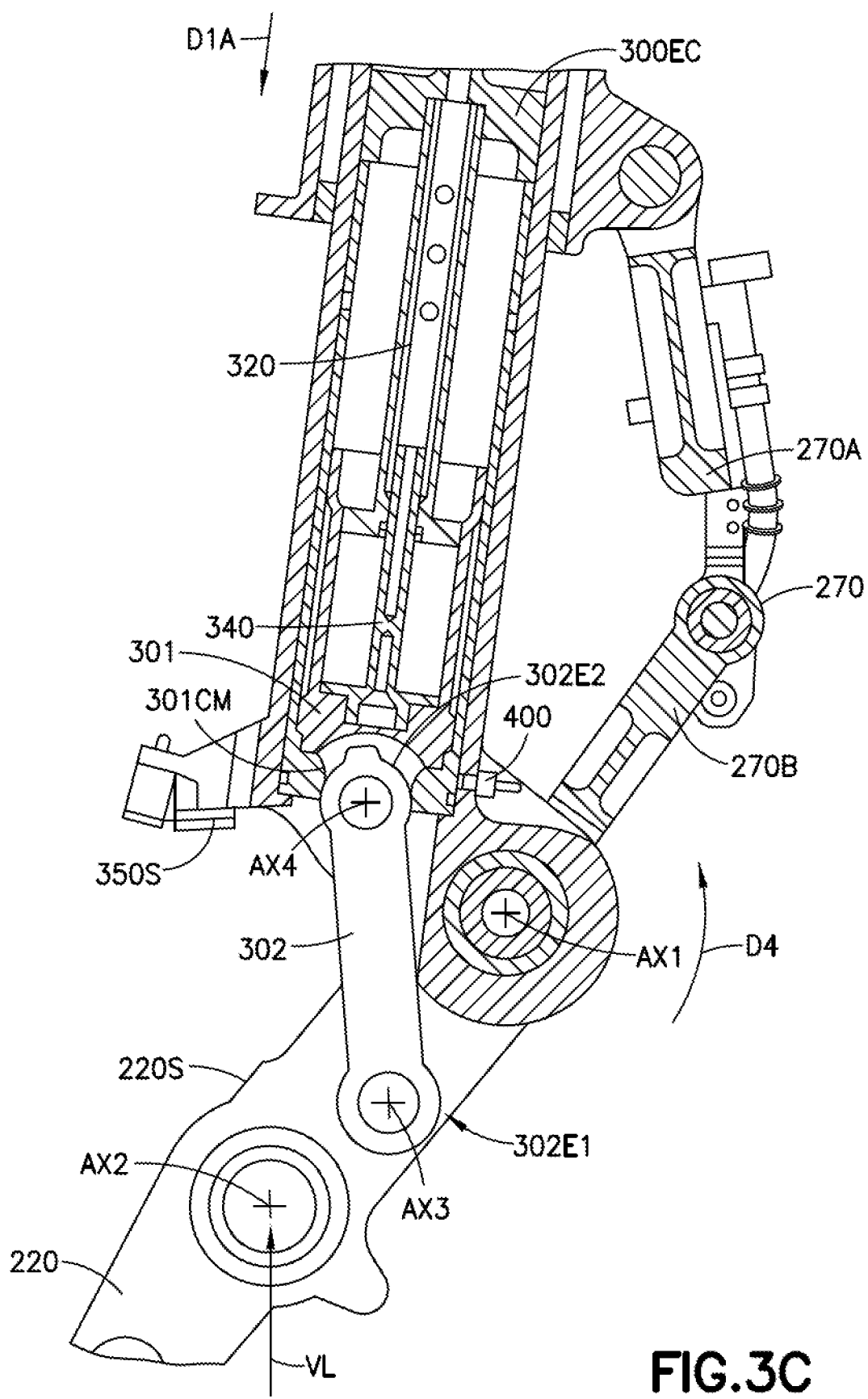
Figure 4:
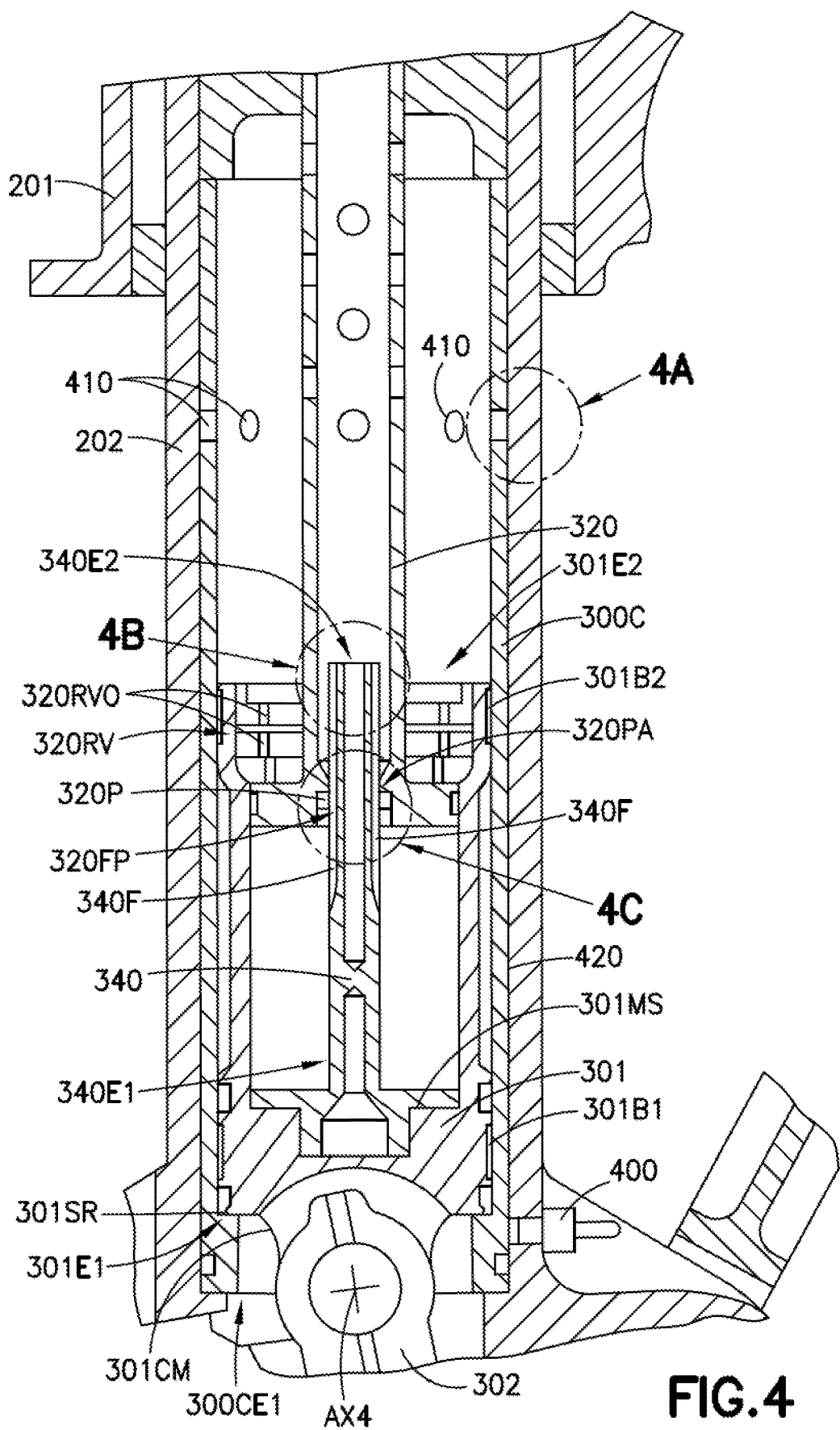
Figure 4A:
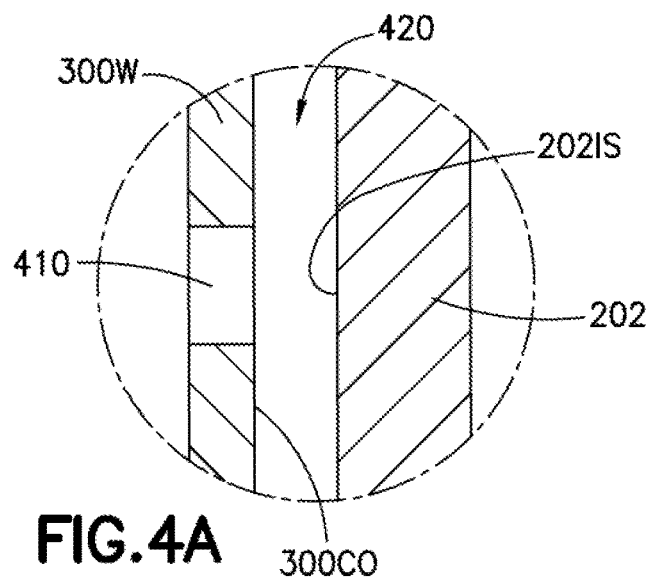
Figure 4B:
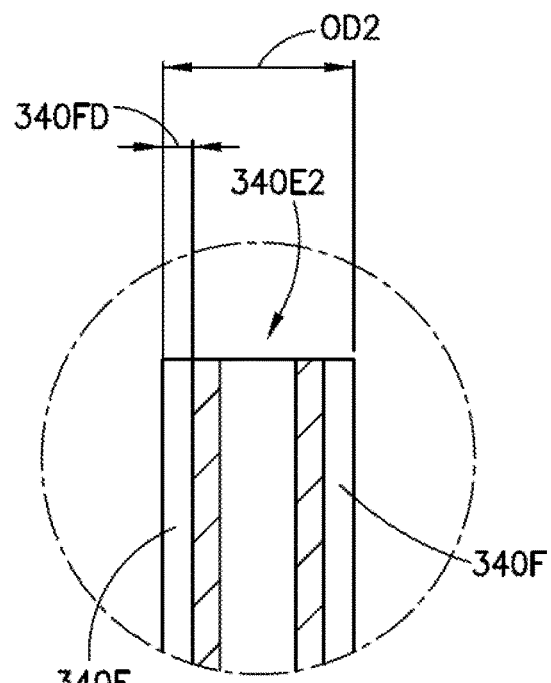
Figure 4C:
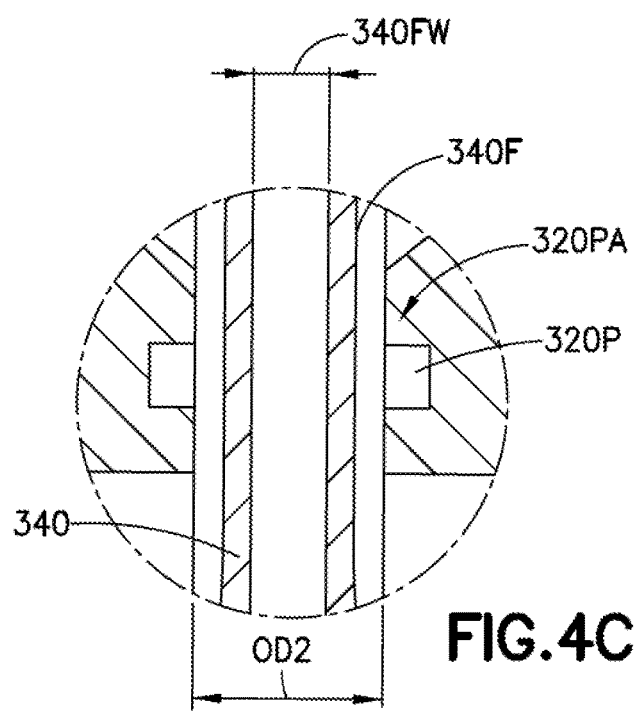
Figure 5A:
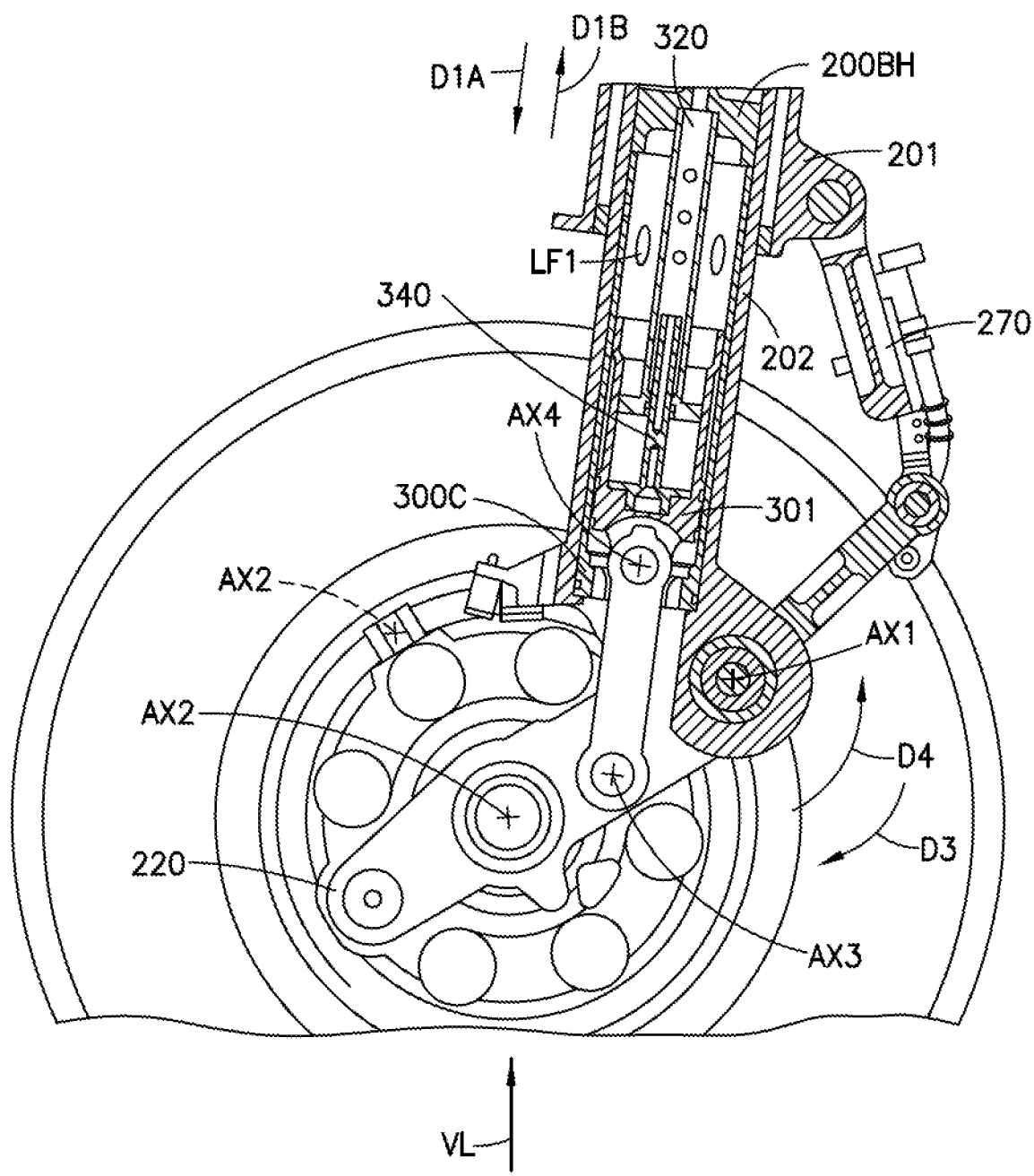
Figure 5B:
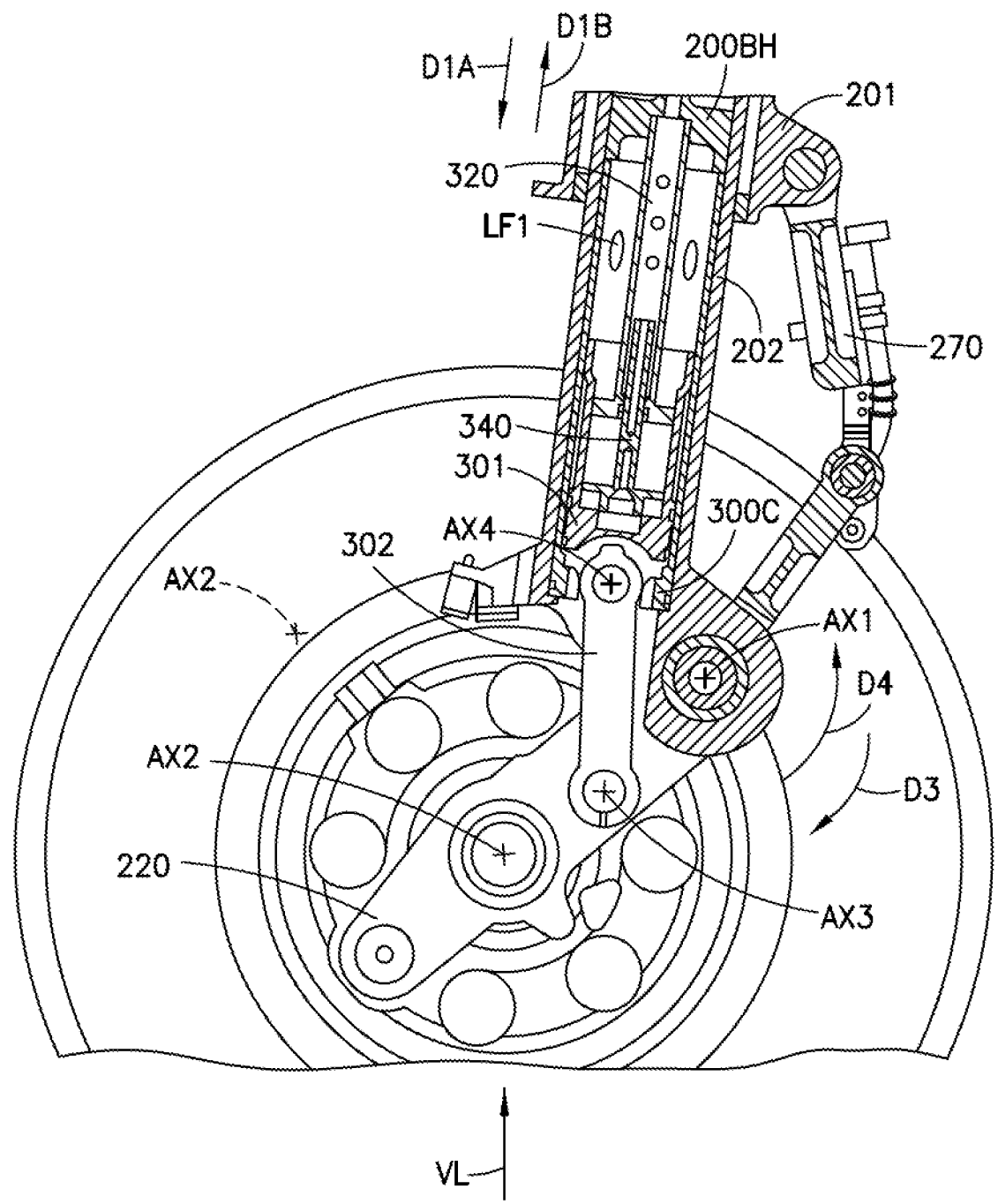
Figure 5C:
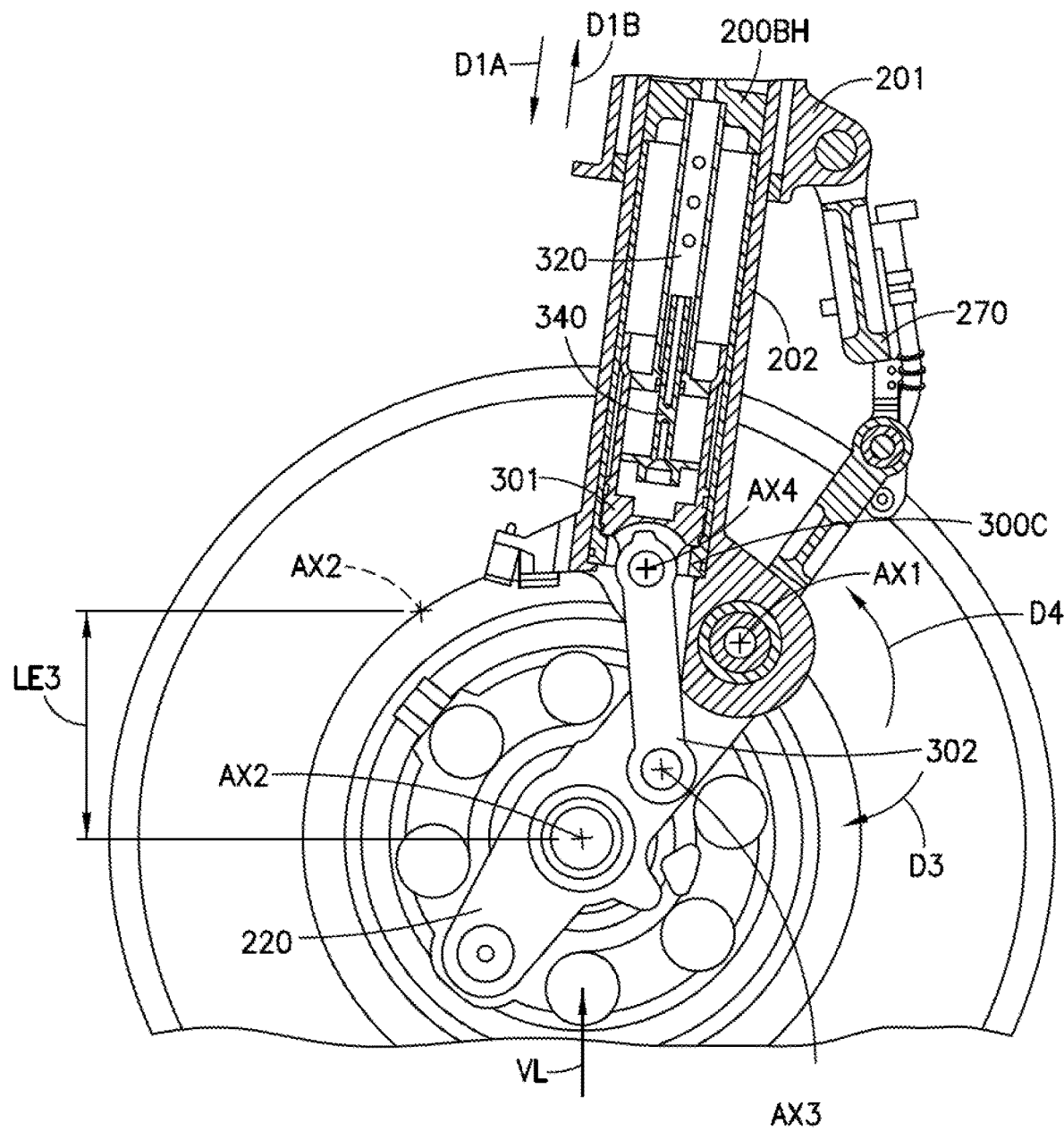
Figure 6:
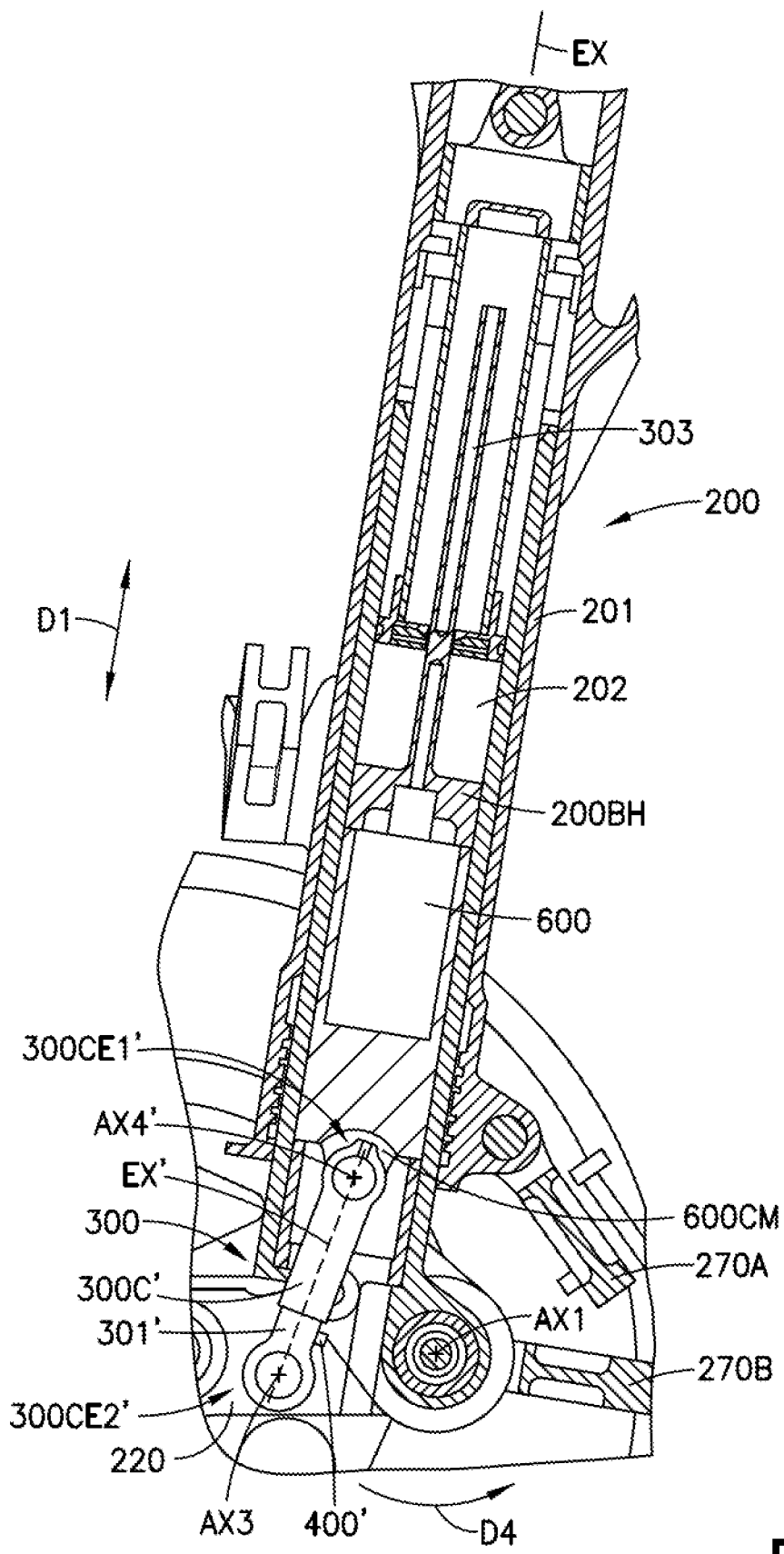
Figure 7A:
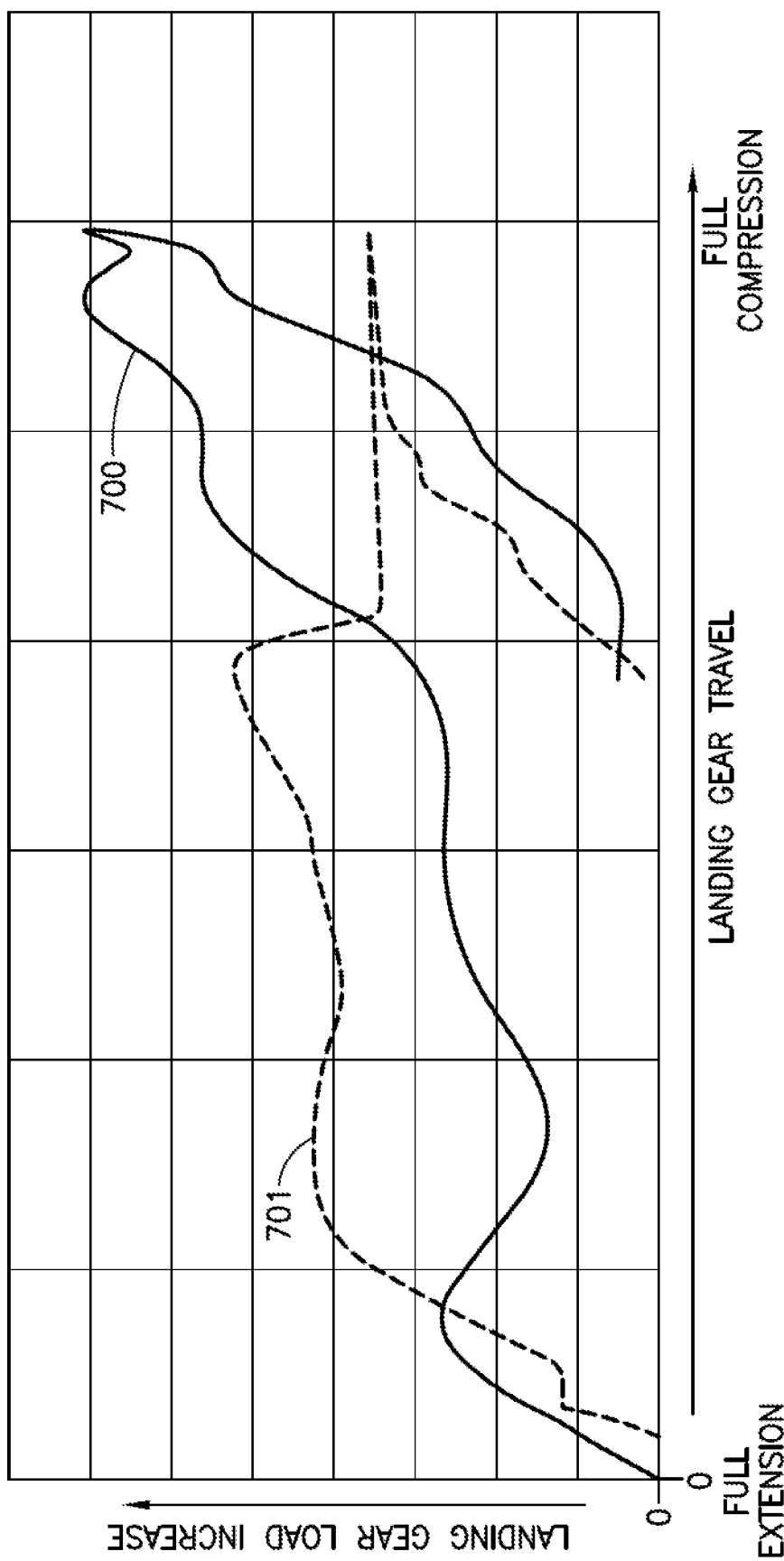
Figure 7B:
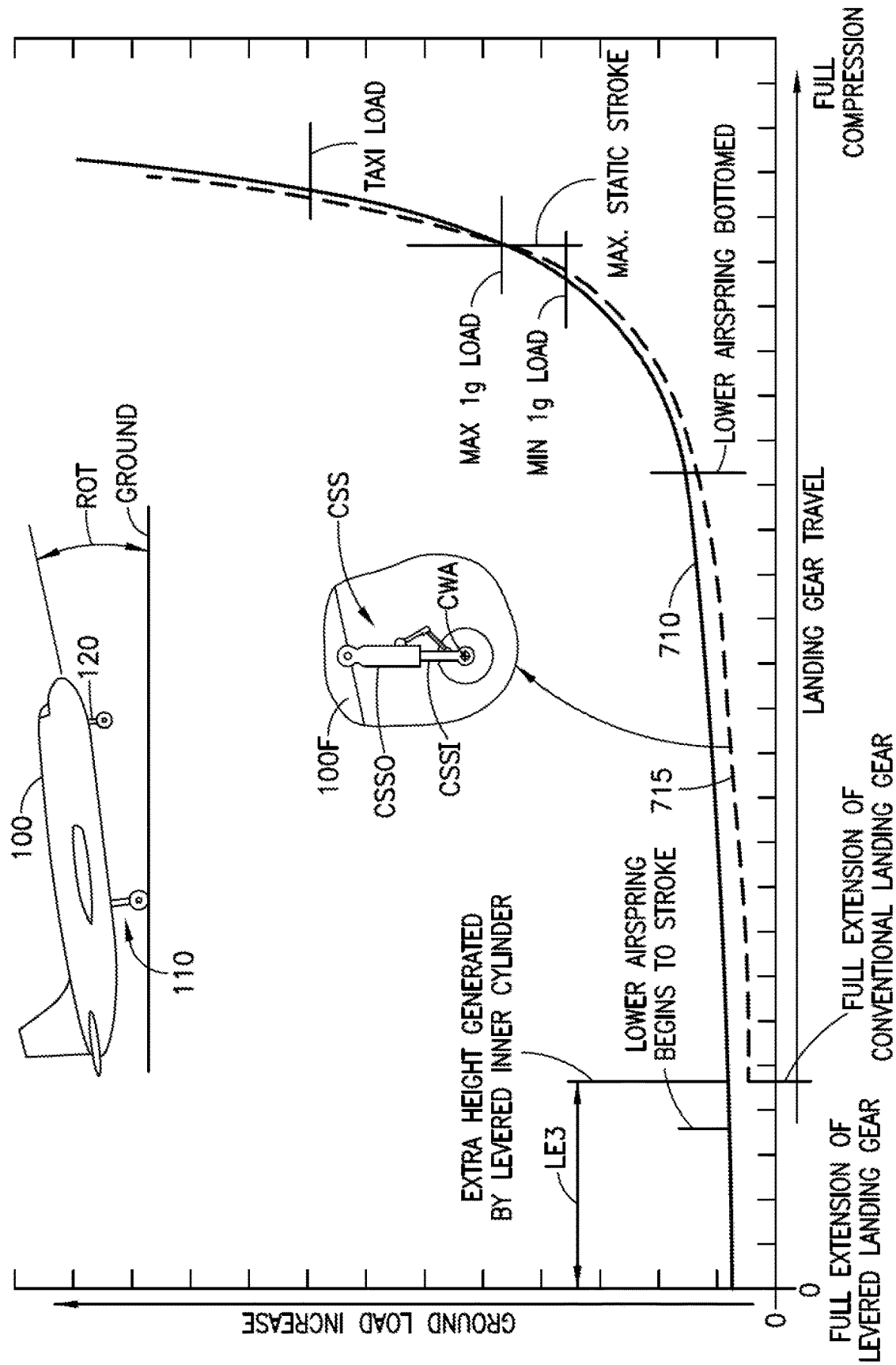
Figure 8:
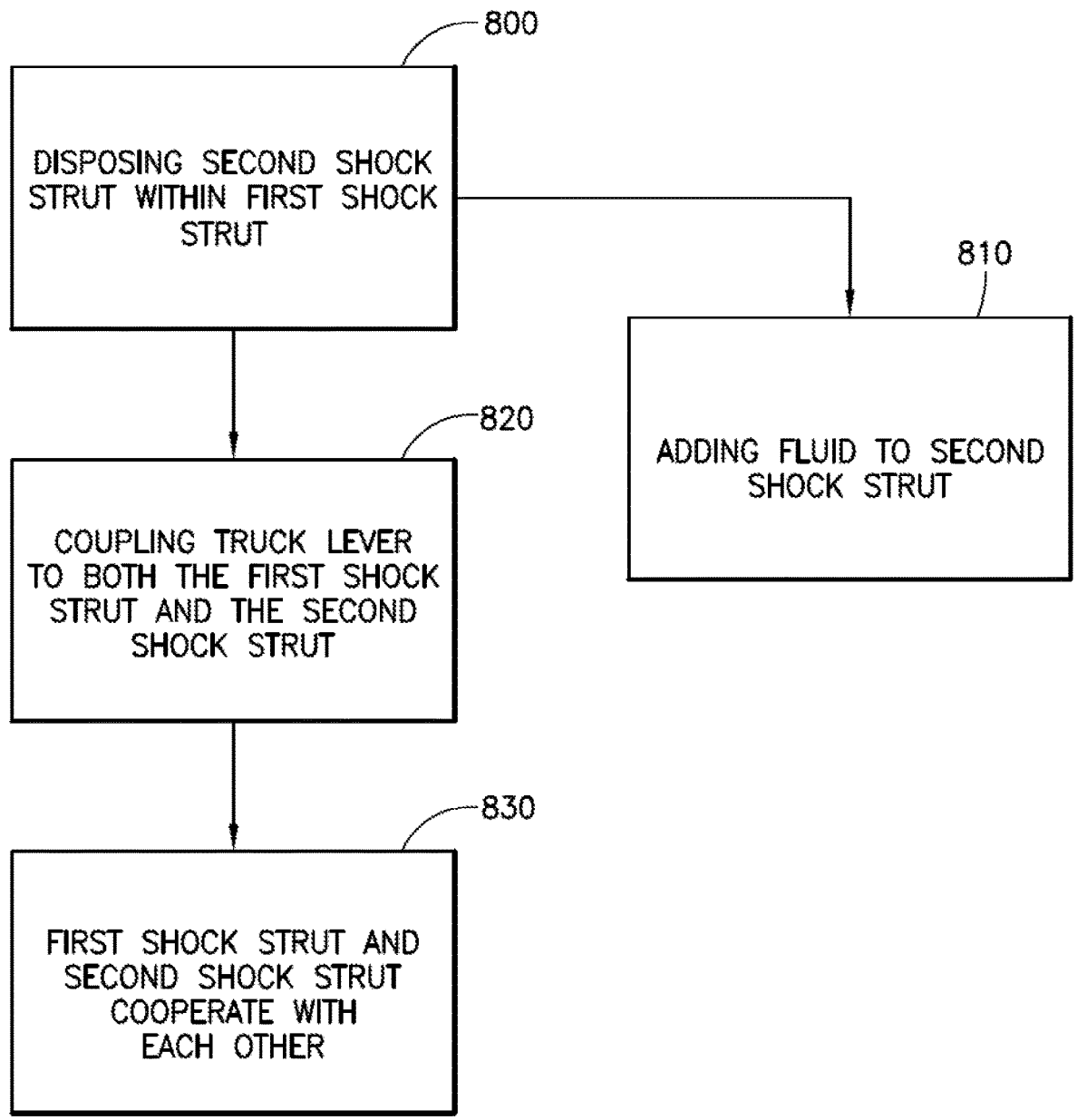

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a perspective view of an aircraft incorporating aspects of the present disclosure;

FIG. 2A is a side view of a levered landing gear in a compressed configuration in accordance with aspects of the present disclosure;

FIG. 2B is a side view of the levered landing gear of FIG. 2A in an extended configuration in accordance with aspects of the present disclosure;

FIGS. 3A, 3A-1, and 3A-2 are cross-sectional side views of a portion of the levered landing gear of FIGS. 2A and 2B in accordance with aspects of the present disclosure;

FIG. 3B is a cross-sectional side view of a portion of the levered landing gear of FIGS. 2A and 2B in accordance with aspects of the present disclosure;

FIG. 3C is a cross-sectional side view of a portion of the levered landing gear of FIGS. 2A and 2B in accordance with aspects of the present disclosure;

FIGS. 4, 4A, 4B and 4C are cross-sectional side views of a portion of the levered landing gear of FIGS. 2A and 2B in accordance with aspects of the present disclosure;

FIGS. 5A-5C are cross-sectional side views of a portion of the levered landing gear of FIGS. 2A and 2B showing a sequence of extension of the levered landing gear in accordance with aspects of the present disclosure;

FIG. 6 is a cross-sectional side view of a levered landing gear in a compressed configuration in accordance with aspects of the present disclosure;

FIG. 7A is an exemplary graph illustrating the cooperation between a first shock strut and a second shock strut of the levered landing gear in accordance with aspects of the present disclosure;

FIG. 7B is an exemplary graph illustrating levered landing gear travel with respect to ground load in accordance with aspects of the present disclosure; and FIG. 8 is an exemplary flow diagram of a method in accordance with aspects of the present disclosure.

DETAILED DESCRIPTION

The apparatus and methods described herein facilitate a levered landing gear that increases vertical axle travel of the levered landing gear compared to conventional landing gear having a single shock strut. Accordingly the aspects of the present disclosure described herein can provide an aircraft including the levered landing gear with an increased take-off height and increased aircraft rotation on take-off. The increased vertical axle travel of the levered landing gear described herein can also be used to absorb landing energy. More specifically, the levered landing gear according to the aspects of the disclosed embodiments include two shock struts disposed relative to each other so that an amount of travel (e.g. distance of extension and retraction of each shock strut) are cumulative so that the two shock struts cooperate with each other to extend and compress the levered landing gear.

Referring to FIGS. 1, 2A and 2B, the aspects of the present disclosure provide an aircraft 100 and a levered landing gear 110 having second shock strut 300 disposed at least partially within a first shock strut 200. Placement of the second shock strut 300 within the first shock strut 200 provides additional travel of the wheel rotation axis AX2 in direction D1 at low load levels (such as, e.g., during takeoff) while preserving higher load carrying capabilities of a conventional shock strut. In one aspect, the second shock strut 300 is at least partially contained within the first shock strut 200 so that the additional travel of the wheel rotation axis AX2 in direction D1 is provided without increasing the size or stroke of the first shock strut 200. The lever element (e.g. the truck lever 220) of the levered landing gear 110 moves the location of the wheel rotation axis AX2, when for example the aircraft 100 is on the ground, aft (in direction D2) of a longitudinal axis LAX and axis of extension EX of the first shock strut 200 and the second shock strut 300 which may allow a center of gravity CG of the aircraft 100 to move aft in direction D2 as well. Moving the center of gravity CG of the aircraft 100 aft may increase an amount of cargo and/or fuel carried by the aircraft 100. In addition to the above, disposing the second shock strut 300 within the first shock strut 200 provides for the use of the levered landing gear 110 without having to re-design a vehicle frame 100F of the aircraft 100.

Illustrative, non-exhaustive examples, which may or may not be claimed, of the subject matter according to the present disclosure are provided below.

Still referring to FIGS. 1, 2A and 2B, the aircraft 100 includes the vehicle frame 100F, the levered landing gear 110, and a landing gear 120. The levered landing gear 110 may be the main landing gear, and landing gear 120 may be a nose landing gear. The levered landing gear 110 includes the first shock strut 200 and the second shock strut 300. The first shock strut 200 includes a first end 200E1 and a second end 200E2 separated from the first end 200E1 along the longitudinal axis LAX. In one aspect, the second shock strut 300 is disposed concentrically with the first shock strut 200 along the longitudinal axis LAX such that the first shock strut 200 and the second shock strut 300 extend along an extension axis EX. The extension axis EX is, in one aspect, a common extension axis along which both the first shock strut 200 and the second shock strut 300 extend and retract. For example, the second shock strut 300 is disposed concentrically within the first shock strut 200 along the longitudinal axis LAX. However, in other aspects as described herein with respect to FIG. 6, the second shock strut 300 may not be disposed concentrically with the first shock strut and may be coupled to the first shock strut 200 so as to pivot relative to the first shock strut 200. The levered landing gear 110 also includes a truck lever 220 that is coupled to both the first shock strut 200 and the second shock strut 300 such that the second shock strut 300 pivots the truck lever 220 relative to the first shock strut 200. The pivoting of the truck lever 220 by the second shock strut 300 increases the travel of the wheel rotation axis AX2 in direction D1. In one aspect, the truck lever 220 includes but one (i.e., only one) wheel rotation axis AX2.

Referring also to FIGS. 3A, 3A-1, 3A-2, and 3B, the first shock strut 200 includes an outer cylinder 201 and an inner cylinder 202 at least partially disposed within the outer cylinder 201, where in one aspect, the second shock strut 300 is disposed at least partially within the inner cylinder 202. The outer cylinder 201 is configured for coupling with the vehicle frame 100F and the inner cylinder 202 extends and retracts along the extension axis EX relative to the outer cylinder 201. The truck lever 220 includes a first end 220E1 and a second end 220E2, where the first end 220E1 is pivotally coupled to the first shock strut 200 at a truck lever pivot axis AX1 and the second end includes the wheel rotation axis AX2. The inner cylinder 202 includes a first end 202E1 and a second end 202E2. The first end 202E1 is disposed within the outer cylinder 201 and the second end 202E2 extends from the outer cylinder 201 and includes the truck lever pivot axis AX1 so that the truck lever 220 is pivotally coupled to the inner cylinder 202 of the first shock strut 200.

The levered landing gear 110 further includes a connecting link 302 that couples the truck lever 220 to the second shock strut 300. The connecting link 302 includes a connecting link first end 302E1 and a connecting link second end 302E2 opposite the connecting link first end 302E1. The connecting link first end 302E1 is pivotally coupled to the truck lever 220 at a connecting pink pivot axis AX3 disposed between the truck lever pivot axis AX1 and the wheel rotation axis AX2. The connecting link second end 302E2 is pivotally coupled to the second shock strut 300 so that the truck lever 220 is pivotally coupled to both the first shock strut 200 and the second shock strut 300.

The second shock strut 300 includes a strut cartridge 300C and a piston 301 that reciprocates within the strut cartridge 300C. The strut cartridge 300C forms an outer cylinder of the second shock strut 300. Here, because the second shock strut 300 is disposed at least partially within the inner cylinder 202, the piston 301 reciprocates within the inner cylinder 202. The piston 301 has a first end 301E1 that includes a connecting link mount 301CM and a second end 301E2 that is longitudinally spaced from the first end 301E1. The connecting link mount 301CM has or otherwise forms a piston pivot axis AX4 where the second end 302E2 of the connecting link 302 is pivotally coupled to the connecting link mount 301CM at the piston pivot axis AX4. The piston 301 includes a first bearing 301B1 disposed adjacent the first end 301E1 and a second bearing 301B2 disposed adjacent the second end 301E2, where the first bearing 301B1 and the second bearing 301B2 are disposed between the piston 301 and the strut cartridge 300C and engage an interior surface 300CI of the strut cartridge 300C so as to guide reciprocating movement of the piston 301 within the strut cartridge 300C. As can be seen in FIGS. 3A, 3A-1, and 3A-2, the connecting link 302 extends from the strut cartridge 300C to connect the piston 301 to the truck lever 220 such that a first end 300CE1 of the strut cartridge 300C facing the truck lever 220 is open. In one aspect, the piston 301 further includes a scraper 301SR that interfaces with, e.g., the interior surface 300CI of the strut cartridge 300C, where the scraper 301SR is configured to clean the interior surface 300CI of the strut cartridge 300C as the piston moves within the strut cartridge 300C. For example, any debris collected within the strut cartridge 300C may be pushed out of the open first end 300CE1 as the second shock strut 300 extends.

The first shock strut 200 of the levered landing gear 110 reacts (e.g. absorbs and/or supports) more of the load VL exerted on the levered landing gear 110 than the second shock strut 300. As such, in one aspect, the levered landing gear 110 comprises a stop member 350 coupled to the inner cylinder 202, where the stop member 350 includes a stop surface 350S configured to interface with the truck lever 220 such that reaction forces FR1, FR2 in response to the load VL bypass the second shock strut 300. For example, the stop member 350 is disposed on the first end 220E1 of the inner cylinder 202 adjacent the truck lever pivot axis AX1 so that as the truck lever 220 pivots about the truck lever pivot axis AX1 in direction D3 a stop surface 220S of the truck lever 220 contacts the stop surface 350S of the stop member 350 thereby arresting rotational movement of the truck lever 220 in direction D3 and so that the load VL acting on the truck lever 220 is reacted by the inner cylinder 202 at the stop member 350 and at the truck lever pivot axis AX1. In one aspect, the stop member 350 may not be provided such as where the second shock strut 300 and connecting link 302 are configured to absorb the reaction forces FR1, FR2. For example, the second shock strut 300 may be configured to compress to a point where the second shock strut 300 reaches a solid height (e.g. cannot be compressed any further) so that the load VL is reacted by the inner cylinder 202 of the first shock strut 200 at least through the connecting link 302 and the second shock strut 300.

The levered landing gear 110 includes at least one torsion link assembly 270 that includes at least two torsion links 270A, 270B that couple the outer cylinder 201 of the first shock strut 200 to the inner cylinder 202 of the first shock strut 200. The at least one torsion link assembly 270 is configured to prevent relative rotation about the common extension axis EX between the outer cylinder 201 and the inner cylinder 202 while allowing relative movement between the outer cylinder 201 and inner cylinder 202 in direction D1 along the common extension axis EX. As described above, the strut cartridge 300C of the second shock strut 300 is coupled to the inner cylinder 202 of the first shock strut and as such the strut cartridge 300C moves in direction D1 as a single unit with the inner cylinder 202 while being rotationally fixed relative to the inner cylinder 202. As also described above, the piston 301 of the second shock strut 300 is coupled to the truck lever 220 through the connecting link 302. The truck lever 220 is coupled to the inner cylinder 202 and is rotationally fixed with the inner cylinder 202 about the common extension axis EX. As such, because the piston 301 of the second shock strut 300 coupled to the truck lever 220 (which is coupled to the inner cylinder 202) and because the strut cartridge 300C of the second shock strut 300 is coupled to the inner cylinder 202, the at least one torsion link assembly 270 is indirectly coupled to the second shock strut 300 and passively prevents rotation of the second shock strut 300 relative to the first shock strut 200 through the indirect coupling. Here, the second shock strut 300 is passively prevented from rotating by the at least one torsion link assembly 270 because the at least one torsion link assembly 270 prevents rotation of the truck lever 220 relative to the outer cylinder 201 and the at least one torsion link assembly is not directly coupled to the second shock strut 300.

Referring to FIGS. 3A, 3A-1, 3A-2 and 3B, the inner cylinder 202 includes an inner chamber 202C, that is bifurcated into a first shock strut compression chamber 380 and a second shock strut compression chamber 390. Fluid UF1, such as a compressed gas, within the first shock strut compression chamber 380 acts as a spring to extend the inner cylinder 202 relative to the outer cylinder 201 as the aircraft 100 takes off. Fluid LF1, such as compressed gas, within the second shock strut fluid compression chamber 390 acts as a spring to extend the second shock strut 300 relative to the inner cylinder 202 as the aircraft 100 takes off. The fluid UF1 in the first shock strut 200 has a first pressure and the fluid LF1 in the second shock strut 300 has a second pressure, where in one aspect, the first pressure is different than the second pressure so as to tailor performance of the levered landing gear 110 to, for example, a particular aircraft 100 (or loading of the aircraft) on which the levered landing gear 110 is installed. In one aspect, strut cartridge 300C of the second shock strut 300 is inserted into the inner cylinder 202 such that the strut cartridge 300C bifurcates the inner chamber 202C and defines the second shock strut fluid compression chamber 390. The strut cartridge 300C of the second shock strut 300 is coupled to the inner cylinder 202 of the first shock strut 200 in any suitable manner, such as by one or more removable fasteners so that the second shock strut 300 is removable from the first shock strut 200, such as for maintenance of the levered landing gear 110. The strut cartridge 300C includes an elongated tube 300T having the first end 300CE1 and the second end 300CE2 and an end cap 300EC disposed at the second end 300CE2. In one aspect the end cap 300EC defines a strut bulkhead 200BH of the first shock strut 200 where the bulkhead 200BH separates the first shock strut 200 and the second shock strut 300 so that fluids UF1 (such as compressed gas) and LF2 (such as hydraulic oil) of the first shock strut 200 do not mix with fluids LF1 (such as compressed gas) and LF2 (such as hydraulic oil) of the second shock strut 300 and so that the first shock strut 200 and the second shock strut 300 are maintained at different operating pressures.

The first shock strut 200 is a gas/oil strut (e.g. also known as an OLEO strut) in which the gas, such as fluid UF1 is disposed above hydraulic oil, such as fluid UF2 where the gas acts as a spring and causes extension of the first shock strut 200 as well as absorb compression forces of the first shock strut 200 while the oil dampens the extension/retraction of the first shock strut 200. Retraction or compression of the first shock strut 200 causes the hydraulic oil (such as fluid UF2) to be forced through fluid flow passages (such as aperture 310PA in an orifice plate 310P of the first shock strut 200) at a controlled rate which provides energy absorption (e.g. damping) and controls a rate at which the first shock strut 200 reacts to applied loads, such as load VL. The first shock strut includes features (such as the metering pin 303) to change a size of the fluid flow passages (such as aperture 310PA) relative to a stroke of the first shock strut 200 (e.g. the difference between extension length LE2 and LE2'). As will be described below the metering pin 303 has a variable area along its length and is positioned within the aperture 310PA, where the aperture 310PA has a fixed area (i.e. the area of the aperture 310PA does not change). Changing the size of the fluid flow passages includes changing a diameter of the metering pin 330 along its length (e.g. the metering pin has a conical shape), or by providing flutes 330F that vary in one or more of a depth (e.g. varying depth 330FD) of the flute 330F or a width 330FW of the flute 330F along the length of the metering pin 303.

The strut bulkhead 200BH of the first shock strut 200 includes the metering pin 330 of the first shock strut 200 so that the first shock strut 200 includes variably sized fluid passages 310FP configured to control a load VL applied to the outer cylinder 201 of the first shock strut 200, where the outer cylinder 201 forms a piston of the first shock strut 200. In one aspect, the strut bulkhead 200BH and the metering pin 330 may be formed as a single monolithic member while in other aspects the metering pin 330 may be coupled to the strut bulkhead 200BH in any suitable manner, such as by any chemical or mechanical fastener. An orifice support tube 310 is coupled to the outer cylinder 201 of the first shock strut 200 so as to extend within the inner cylinder 202 towards the strut bulkhead 200BH. The orifice support tube 310 includes an orifice plate 310P that includes an aperture 310PA through which the metering pin 330 extends. The metering pin 330 of the first shock strut 200 includes a first end 330E1 proximate the strut bulkhead 200BH and a second end 330E2 longitudinally separated from the first end 330E1 where the metering pin 330 has a constant outer diameter OD1 between the first end 330E1 and the second end 330E2, where the outer diameter OD1 is sized to slidingly interface with the aperture 310PA of the orifice plate 310P.

In other aspects, the metering pin 330 may have a tapered outer diameter in lieu of flutes 330F as described herein where the tapered outer diameter controls fluid flow through the aperture 310PA in a manner substantially similar to that described herein with respect to the flutes 330F. The metering pin 330 includes the flutes 330F which are longitudinally arranged on the metering pin 330 between the first end 330E1 and the second end 330E2 where the flutes 330F having a varying depth 330FD relative to the outer diameter OD1 so as to form the variably sized fluid passages 310FP and so that a fluid flow through the flutes 330F at the interface between the metering pin 330 and the aperture 310PA is greater at the second end 330E2 than fluid flow through the flutes at the first end 330E1. Here, the fluid UF2 passes through the variably sized fluid passages 310FP to control the reactive load on the outer cylinder 202 (e.g. piston) of the first shock strut 200 where the load on the outer cylinder 202 is decreased when the second end 330E2 (where the flute depth is the deepest) of the metering pin 330 is adjacent the orifice plate 310P and is increased when the first end 330E1 of the metering pin 330 is adjacent the orifice plate 310P (where the flute depth is the shallowest).

The first shock strut 200 also includes features that control a rate of extension of the first shock strut 200. For example, the first shock strut 200 includes a recoil valve 310RV that is configured such that extension of the first shock strut 200 causes the fluid UF2 to be forced through orifices in the recoil valve 310RV at a controlled rate that in turn controls the rate at which the first shock strut 200 extends. In one aspect the recoil valve 320RV is coupled to the inner cylinder 202 in any suitable manner. Upon compression of the first shock strut 200 the recoil valve 310RV is configured such that the orifices are open allowing the fluid UF2 to flow freely through fluid passages 310FP.

Referring to FIGS. 3A, 3A-1, 3A-2, 3B, 3C, 4 and 4A-4C, the second shock strut 300 is a gas/oil strut (e.g. also known as an OLEO strut) in which the gas, such as fluid LF1 is disposed above hydraulic oil, such as fluid LF2 where the gas acts as a spring and causes extension of the second shock strut 300 as well as absorb compression forces of the second shock strut 300 while the oil dampens the extension/retraction of the second shock strut 300. Retraction or compression of the second shock strut 300 causes the hydraulic oil (such as fluid LF2) to be forced through fluid flow passages (such as aperture 320PA in an orifice plate 320P of the second shock strut 300) at a controlled rate which provides energy absorption (e.g. damping) and controls a rate at which the second shock strut 300 reacts to applied loads, such as load VL. The second shock strut includes features (such as the metering pin 340) to change a size of the fluid flow passages (such as aperture 320PA) relative to a stroke of the second shock strut 300 (e.g. extension length LE3). As described herein the metering pin 340 has a variable area along its length and is positioned within the aperture 320PA, where the aperture 320PA has a fixed area (i.e. the area of the aperture 320PA does not change). In one aspect, changing the size of the fluid flow passages includes changing a diameter of the metering pin 340 along its length, or by providing flutes 340F that vary in one or more of a depth (e.g. varying depth 340FD) of the flute 340F or a width 340FW of the flute 340F along the length of the metering pin 340.

The piston 301 of the second shock strut 300 includes the metering pin 340 of the second shock strut 300 so that the second shock strut 300 includes variably sized fluid passages 320FP configured to control a load VL applied to the piston 301 of the second shock strut 300. The metering pin 340 is coupled to a mounting surface 301MS of the piston 301 of the second shock strut 300. In one aspect, piston 301 and the metering pin 340 may be formed as a single monolithic member while in other aspects the metering pin 340 may be coupled to the piston in any suitable manner, such as by any chemical or mechanical fastener. An orifice support tube 320 is coupled to the first shock strut 200, such as coupled to the strut bulkhead 200BH, so as to extend within the strut cartridge 300C towards the piston 301. The orifice support tube 320 includes an orifice plate 320P that includes an aperture 320PA through which the metering pin 340 extends. The metering pin 340 of the second shock strut 300 includes a first end 340E1 proximate the first end 301E1 of the piston 301 and a second end 340E2 longitudinally separated from the first end 340E1 where the metering pin 340 has a constant outer diameter OD2 between the first end 340E1 and the second end 340E2, where the outer diameter OD2 is sized to slidingly interface with the aperture 320PA of the orifice plate 320P.

In other aspects, the metering pin 340 may have a tapered outer diameter in lieu of the flutes as described herein where the tapered outer diameter controls fluid flow through the aperture 320PA in a manner substantially similar to that described herein with respect to the flutes 340F. The metering pin 340 includes the flutes 340F which are longitudinally arranged on the metering pin 340 between the first end 340E1 and the second end 340E2 where the flutes 340F having a varying depth 340FD relative to the outer diameter OD2 so as to form the variably sized fluid passages 320FP and so that a fluid flow through the flutes 340F at the interface between the metering pin 340 and the aperture 320PA is greater at the second end 340E2 than fluid flow through the flutes 340F at the first end 340E1. Here the fluid LF2 passes through the variably sized fluid passages 320FP to control the reactive load on the piston 301 of the second shock strut 300 where the load on the piston 301 is decreased when the second end 340E2 (where the flute depth is the deepest) of the metering pin 340 is adjacent the orifice plate 320P and is increased when the first end 340E1 of the metering pin 340 is adjacent the orifice plate 320P (where the flute depth is the shallowest).

The second shock strut 300 also includes features that control a rate of extension of the second shock strut 300. For example, the second shock strut 300 includes a recoil valve 320RV (which is substantially similar to recoil valve 310RV) that is configured such that extension of the second shock strut 300 causes the fluid LF2 to be forced through orifices 320RVO in the recoil valve 320RV at a controlled rate that in turn controls the rate at which the second shock strut 300 extends. In one aspect, the recoil valve 320RV is coupled to the orifice support tube 320 while in other aspects the recoil valve 320RV is coupled to the strut cartridge 300C in any suitable manner. Upon compression of the second shock strut 300 the recoil valve 320RV is configured such that the orifices 320RVO are open allowing the free flow of fluid LF2 through the variably sized fluid passages 320FP. The compression and extension of the second shock strut 300 may be set or otherwise adjusted to compliment the compression and extension of the first shock strut 200 such that the second shock strut 300 does not cause any undesired rebound during extension and retraction of the levered landing gear 110.

In one aspect, referring to FIGS. 3B, 3C, 4 and 4A-4C the second shock strut 300 is serviceable through the first shock strut 200 so that, for example, the second shock strut 300 is filled with gas and oil through the first shock strut 200 so that the second shock strut 300 is at a predetermined operating pressure and oil level. A second shock strut service fitting 400 is disposed on the first shock strut 200 and at least one fluid flow aperture 410 extends through a wall 300W of the strut cartridge 300C of the second shock strut 300. For example, the second shock strut service fitting 400 is disposed on the inner cylinder 202 of the first shock strut 200 adjacent the first end 220E1 of the inner cylinder 202. The strut cartridge 300C of the second shock strut is coupled to the inner cylinder 202 of the first shock strut 200 and is configured so that a space exists between an outer surface 300OO of the strut cartridge 300C and an interior surface 202IS of the inner cylinder 202 of the first shock strut 200, where the space defines a fluid passage 420 between the second shock strut service fitting 400 and the at least one fluid flow aperture 410 of the strut cartridge 300C. The second shock strut service fitting 400 is coupled to the inner cylinder 202 so as to be in communication with the fluid passage 420 so that as gas and/or oil flows into the levered landing gear 110 the fluid enters and passes through the fluid flow passage 420 and through the at least one fluid flow aperture 410 thereby entering the second shock strut fluid compression chamber 390 within the strut cartridge 300C. The second shock strut service fitting 400 may include any suitable check valve so that once the gas/oil enters into the fluid flow passage 420 the fluid cannot exit through the second shock strut service fitting 400.

Referring to FIG. 6, as noted above, the second shock strut 300 may be pivotally coupled to the inner cylinder 202 of the first shock 200 and the truck lever 220. For example, the second shock strut 300 is disposed between the second end 202E2 of the first shock strut 200 inner cylinder 202 and the truck lever 220, where the second shock strut 300 has a first end 300CE1' and a second end 300CE2', the first end 300CE1' of the second shock strut 300 is coupled to the second end 202E2 of the first shock strut 200 inner cylinder 202 and the second end 300CE2' of the second shock strut 300 is coupled to the truck lever 220. For example, in this aspect, the second shock strut 300 includes an outer cylinder 300C' forming one of the first end 300CE1' and second end 300CE2' of the second shock strut 300 and an inner cylinder 301' forming the other of the first end 300CE1' and second end 300CE2' of the second shock strut 300 where the second shock strut 300 is pivotally coupled to the inner cylinder 202 of the first shock strut 200 and is directly (e.g. without any intervening coupling members) pivotally coupled to the truck lever 220. The outer cylinder 300C' and the inner cylinder 301' move relative to each other in a manner similar that with the strut cartridge 300C and piston 301.

In one aspect, the outer cylinder 300C' is substantially similar to the strut cartridge 300C in that the outer cylinder 300C' includes at least the second shock strut fluid compression chamber 390, the orifice support tube 320, recoil valve 320RV and the orifice plate 320P of the strut cartridge 300C described above. In one aspect, the inner cylinder 301' is substantially similar to the piston 301 in that the inner cylinder 301' includes the metering pin 340 (similar to inner cylinder 202 of the first shock strut 200). The outer cylinder 300C' is pivotally coupled to the inner cylinder 202 of the first shock strut 200 at pivot axis AX4' so as to be located in a fixed spatial position relative to the inner cylinder 202 (e.g. the pivot axis AX4' does not move relative to the inner cylinder 202). The pivot axis AX4' may be formed by a mount 600CM that is integrally formed as a monolithic member with the inner cylinder 202 while in other aspects, the pivot axis AX4' may be formed by the mount 600CM that is formed by any suitable cartridge 600 that is inserted into the inner cylinder 202 in a manner substantially similar to that described above with respect to the strut cartridge 300C. The inner cylinder 301' is pivotally coupled to the truck lever 220 at the connecting link pivot axis AX3 so that extension of the second shock strut 300 between the axes AX4' and AX3 causes the truck lever to pivot about the truck lever pivot axis AX1 in direction D4, so that in combination with the extension of the first shock strut 200, the levered landing gear is extended from extension length LE1 to extension length LE1' as illustrated in FIGS. 2A and 2B; and similarly is compressed from extension length LE1' to extension length LE1 where the truck lever rotates in direction D3 about the truck lever pivot axis AX1.

Referring now to FIGS. 2A and 2B, the first shock strut 200 and the second shock strut 300 are configured so as to cooperate with each other to absorb landing energy as well as to cooperate with each other to extend the levered landing gear. An extension length (e.g. the difference between extension lengths LE1' and LE1) of the levered landing gear 110 is defined by a combination of an extension length (e.g. the difference between extension lengths LE2' and LE2) of the first shock strut 200 and an extension length LE3 of the second shock strut 300. For example, the levered landing gear 110 has a retracted or compressed extension length LE1 and an extended extension length LE1'. To extend from extension length LE1 to extension length LE1', the first shock strut 200 extends from extension length LE2, which is a compressed or retracted configuration of the first shock strut, to extension length LE2'. While the first shock strut 200 is extending, at least part way through the extension of the first shock strut 200, the second shock strut 300 extends a distance LE3 providing the levered landing gear 110 with an overall extension length of LE1'. Referring also to FIGS. 3B, 3C and 5A-5C, when the second shock strut 300 is in the retracted configuration, the truck lever 220 is in contact with the stop member 350 (or in other aspects the second shock strut is at a solid height). As the aircraft 100 is taking off, the first shock strut extends in direction D1A where the extension of the first shock strut 200 and the second shock strut 300 occurs substantially simultaneously over at least a portion of the extension of the levered landing gear 110, noting the position of the strut bulkhead 200BH relative to the outer cylinder 201 in FIGS. 5A and 5B. As the load VL on the levered landing gear 110 decreases due to lift generated by wings of the aircraft 100 the second shock strut 300 extends from the retracted configuration where the fluid LF1 expands to push the piston 301 in direction D1A so that the connecting link 302 pushes on the truck lever 220 to rotate the truck lever 220 about the truck lever pivot axis AX4 in direction D4.

Retraction of the levered landing gear 110 from the extension length LE1' to the extension length LE1 occurs in substantially reverse manner to that described above. For example, upon landing of the aircraft 100 the load VL acts on the truck lever 220 to rotate the truck lever 220 in direction D3 about the truck lever pivot axis AX1. Rotation of the truck lever 220 in direction D3 causes the connecting link 302 to push on the piston 301, thereby compressing the fluid LF1 so that at least a portion of the load VL is absorbed by the fluid FL1. As the load VL increases, e.g., from decreased lift generated by the wings of the aircraft 100 or by downward motion of the aircraft 100, the inner cylinder 202 of the first shock strut 200 moves in direction D1B relative to the outer cylinder 201 to compress the fluid UL1 so that at least a portion of the load VL is absorbed by the fluid UL1. As described above, the retraction of the first shock strut 200 and the second shock strut 300 occurs substantially simultaneously over at least a portion of the extension of the levered landing gear 110, again noting the position of the strut bulkhead 200BH relative to the outer cylinder 201 in FIGS. 5A and 5B. As the load VL continues to increase the truck lever 220 rotates in direction D3 so that the truck lever 220 contacts the stop member 350 thereby transferring the entirety of the load VL to the first shock strut 200.

Cooperation between the first shock strut 200 and the second shock strut 300 during extension and retraction of the levered landing gear is illustrated in the graph shown in FIG. 7A. In this graph the load on the first shock strut 700 and the load on the second shock strut 701 is shown relative to travel (e.g. extension and retraction) of the levered landing gear 110. The graph of FIG. 7A illustrates the first shock strut 200 and the second shock strut 300 working together to extend and retract the landing and absorb the load VL where, for example, the landing energy absorption is managed between the first shock strut 200 and the second shock strut 300 by regulating the flow of fluid FL2 (such as the hydraulic oil) in the second shock strut 300 so that the truck lever 220 contacts the stop member 350 of the inner cylinder 202 of the first shock strut at a predetermined velocity.

Referring also to FIG. 7B, a graph is illustrated showing the take-off performance 710 of the levered landing gear 110 compared to the take off performance 715 of a conventional landing gear CSS having a single shock strut (with an outer cylinder CSSO and an inner cylinder CSSI that are moveable relative to each other) and a single wheel axis CWA. Here it can be seen that, at full extension, the increased extension LE3 of the levered landing gear 110 provided by the second shock strut 300 (compared to the conventional landing gear CSS) provides the aircraft with an increased ground load, which may result in increased rotation angle ROT performance of the aircraft at lake off (and landing).

For example, the aspects of the present disclosure may provide the aircraft with an additional 1 degree or more of rotation on take-off (and landing) compared to an aircraft that has the conventional single shock strut/single wheel axis landing gear. FIG. 7A also illustrates the substantially simultaneous extension of both the first shock strut 200 and the second shock strut 300 (as described above with respect to FIGS. 5A-5C) over at least a portion of the extension of the levered landing gear 110.

Referring now to FIGS. 3A, 3A-1, 3A-2, 6 and 8 an exemplary operation of the levered landing gear 110 will be described. In one aspect, the second shock strut is disposed at least partially within the first shock strut (FIG. 8, Block 800). In one aspect, the second shock strut 300 is disposed concentrically with and/or within a first shock strut 200, along the longitudinal axis LAX of the first shock strut 200, such that the first shock strut 200 and the second shock strut 300 extend along a common extension axis EX; while in other aspects, the second shock strut 300 is pivotally coupled to the first shock strut 200 where the first shock strut extends along extension axis EX and the second shock strut 300 extends along extension axis EX' where the spatial orientation of the extension axis EX' of the second shock strut 300 changes relative to the extension axis EX of the first shock strut 200 as the levered landing gear 110 extends and retracts in direction D1. Fluid is added to the second shock strut (FIG. 8, Block 810). For example, fluid may be added to the second shock strut 300 through the second shock strut service fitting 400 as described above; while in other aspects, such as shown in FIG. 6, the fluid may be added to the second shock strut 300 through a second shock strut service fitting 400' directly coupled to the inner cylinder 301'. The truck lever 220 is coupled to both the first shock strut 200 and the second shock strut 300 (FIG. 8, Block 820) in the manners described above so that the first shock strut 200 and the second shock strut 300 cooperatively extend the levered landing gear 110 and cooperatively absorb landing energy (FIG. 8, Block 830).

The following are provided in accordance with the aspects of the present disclosure:

A1. A levered landing gear comprising:
a first shock strut having a longitudinal axis;
a second shock strut disposed concentrically with and/or within the first shock strut along the longitudinal axis such that the first shock strut and the second shock strut extend along a common extension axis; and
a truck lever coupled to both the first shock strut and the second shock strut such that the second shock strut pivots the truck lever relative to the first shock strut.

A2. The levered landing gear of paragraph A1, wherein the first shock strut includes an outer cylinder and an inner cylinder at least partially disposed within the outer cylinder, the outer cylinder being configured for coupling with a vehicle frame and the inner cylinder extends and retracts relative to the outer cylinder.

A3. The levered landing gear of paragraph A2, wherein the second shock strut is disposed at least partially within the inner cylinder.

A4. The levered landing gear of paragraph A2, wherein the second shock strut includes a piston that reciprocates within the inner cylinder.

A5. The levered landing gear of paragraph A4, further comprising a connecting link coupling the piston to the truck lever.

A6. The levered landing gear of paragraph A2, wherein the inner cylinder includes an inner chamber, the inner chamber being bifurcated into a first shock strut fluid compression chamber and a second shock strut fluid compression chamber, where fluid within the first shock strut compression chamber extends the inner cylinder relative to the outer cylinder and fluid within the second shock strut fluid compression chamber extends the second shock strut relative to the inner cylinder.

A7. The levered landing gear of paragraph A6, wherein the second shock strut comprises a strut cartridge inserted into the inner chamber, where the strut cartridge bifurcates the inner chamber and defines the second shock strut fluid compression chamber.

A8. The levered landing gear of paragraph A7, wherein the strut cartridge comprises an elongated tube and an end cap, the end cap defines a strut bulkhead of the first shock strut.

A9. The levered landing gear of paragraph A8, wherein the strut bulkhead of the first shock strut includes a metering pin of the first shock strut.

A10. The levered landing gear of paragraph A9, wherein the metering pin of the first shock strut includes a first end proximate the strut bulkhead, a second end longitudinally separated from the first end, and flutes longitudinally arranged on the metering pin between the first end and the second end, the flutes having a varying depth so that a fluid flow through the flutes is greater at the second end than fluid flow through the flutes at the first end.

A11. The levered landing gear of paragraph A2, further comprising a stop member coupled to the inner cylinder, the stop member including a stop surface configured to interface with the truck lever such that reaction forces bypass the second shock strut.

A12. The levered landing gear of paragraph A1, wherein the truck lever includes a first end and a second end, the first end being pivotally coupled to the first shock strut at a truck lever pivot axis and the second end includes a wheel rotation axis; and
a connecting link having a connecting link first end and a connecting link second end opposite the connecting link first end, the connecting link first end being coupled to the truck lever between the truck lever pivot axis and the wheel rotation axis, and the connecting link second end being coupled to the second shock strut.

A13. The levered landing gear of paragraph A12, wherein the connecting link is pivotally coupled to both the second shock strut and the truck lever.

A14. The levered landing gear of paragraph A12, wherein the truck lever includes but one wheel rotation axis.

A15. The levered landing gear of paragraph A1, wherein an extension length of the levered landing gear is defined by a combination of an extension length of the first shock strut and an extension length of the second shock strut.

A16. The levered landing gear of paragraph A1, further comprising at least one torsion link assembly coupling an inner cylinder and outer cylinder of the first shock strut.

A17. The levered landing gear of paragraph A16, wherein the at least one torsion link assembly is configured to prevent rotation of the second shock strut relative to the first shock strut.

A18. The levered landing gear of paragraph A1, wherein the first shock strut and the second shock strut are configured so as to cooperate with each other to absorb landing energy.

A19. The levered landing gear of paragraph A1, wherein the first shock strut and the second shock strut are configured so as to cooperate with each other to extend the levered landing gear.

A20. The levered landing gear of paragraph A1, wherein the second shock strut comprises:
a metering pin coupled to a mounting surface of a piston of the second shock strut; and
an orifice plate that cooperates with the metering pin to meter an amount of fluid flow as the second shock strut is compressed.

A21. The levered landing gear of paragraph A20, wherein the metering pin includes a first end proximate the mounting surface of the piston, a second end longitudinally separated from the first end, and flutes longitudinally arranged on the metering pin between the first end and the second end, the flutes having a varying depth so that a fluid flow through the flutes is greater at the second end than fluid flow through the flutes at the first end.

A22. The levered landing gear of paragraph A1, wherein the second shock strut includes a strut cartridge and a piston that reciprocates within the strut cartridge, the piston having a first end including a connecting link mount and a second end, longitudinally spaced from the first end.

A23. The levered landing gear of paragraph A22, wherein the piston further comprises a first bearing disposed adjacent the first end and a second bearing disposed adjacent the second end, the first bearing and the second bearing being disposed between the piston and the strut cartridge.

A24. The levered landing gear of paragraph A22, wherein the piston further comprises a scraper that interfaces with the strut cartridge, the scraper being configured to clean an interior surface of the strut cartridge as the piston moves within the strut cartridge.

A25. The levered landing gear of paragraph A1, wherein the first shock strut includes variably sized fluid passages configured to control a load applied to an outer cylinder of the first shock strut, where the outer cylinder forms a piston of the first shock strut.

A26. The levered landing gear of paragraph A1, wherein the second shock strut includes variably sized fluid passages configured to control a load applied to a piston of the second shock strut.

A27. The levered landing gear of paragraph A1, further comprising a second shock strut service fitting disposed on the first shock strut, and at least one fluid flow aperture extending through a wall of a strut cartridge of the second shock strut, wherein a space between an outer surface of the second shock strut and an interior surface of the first shock strut defines a fluid passage between the second shock strut service fitting and the at least one fluid flow aperture.

A28. An aircraft comprising the levered landing gear of any one of paragraphs A1 to A27.

B1. An aircraft comprising:
a vehicle frame; and
a levered landing gear coupled to the airframe, the levered landing gear including
a first shock strut having a longitudinal axis,
a second shock strut disposed concentrically with and/or within the first shock strut along the longitudinal axis such that the first shock strut and the second shock strut extend along a common extension axis, and
a truck lever coupled to both the first shock strut and the second shock strut such that the second shock strut pivots the truck lever relative to the first shock strut.

B2. The aircraft of paragraph B1, wherein
the first shock strut includes an outer cylinder and an inner cylinder at least partially disposed within the outer cylinder, the outer cylinder being configured for coupling with the vehicle frame and the inner cylinder extends and retracts relative to the outer cylinder.

B3. The aircraft of paragraph B2, wherein the second shock strut is disposed at least partially within the inner cylinder.

B4. The aircraft of paragraph B2, wherein the second shock strut includes a piston that reciprocates within the inner cylinder.

B5. The aircraft of paragraph B4, further comprising a connecting link coupling the piston to the truck lever.

B6. The aircraft of paragraph B2, wherein the inner cylinder includes an inner chamber, the inner chamber being bifurcated into a first shock strut fluid compression chamber and a second shock strut fluid compression chamber, where fluid within the first shock strut compression chamber extends the inner cylinder relative to the outer cylinder and fluid within the second shock strut fluid compression chamber extends the second shock strut relative to the inner cylinder.

B7. The aircraft of paragraph B6, wherein the second shock strut comprises a strut cartridge inserted into the inner chamber, where the strut cartridge bifurcates the inner chamber and defines the second shock strut fluid compression chamber.

B8. The aircraft of paragraph B7, wherein the strut cartridge comprises an elongated tube and an end cap, the end cap defines a strut bulkhead of the first shock strut.

B9. The aircraft of paragraph B8, wherein the strut bulkhead of the first shock strut includes a metering pin of the first shock strut.

B10. The aircraft of paragraph B9, wherein the metering pin of the first shock strut includes a first end proximate the strut bulkhead, a second end longitudinally separated from the first end, and flutes longitudinally arranged on the metering pin between the first end and the second end, the flutes having a varying depth so that a fluid flow through the flutes is greater at the second end than fluid flow through the flutes at the first end.

B11. The aircraft of paragraph B2, further comprising a stop member coupled to the inner cylinder, the stop member including a stop surface configured to interface with the truck lever such that reaction forces bypass the second shock strut.

B12. The aircraft of paragraph B1, wherein
the truck lever includes a first end and a second end, the first end being pivotally coupled to the first shock strut at a truck lever pivot axis and the second end includes a wheel rotation axis; and
a connecting link having a connecting link first end and a connecting link second end opposite the connecting link first end, the connecting link first end being coupled to the truck lever between the truck lever pivot axis and the wheel rotation axis, and the connecting link second end being coupled to the second shock strut.

B13. The aircraft of paragraph B12, wherein the connecting link is pivotally coupled to both the second shock strut and the truck lever.

B14. The aircraft of paragraph B12, wherein the truck lever includes but one wheel rotation axis.

B15. The aircraft of paragraph B1, wherein an extension length of the levered landing gear is defined by a combination of an extension length of the first shock strut and an extension length of the second shock strut.

B16. The aircraft of paragraph B1, further comprising at least one torsion link assembly coupling an inner cylinder and outer cylinder of the first shock strut.

B17. The aircraft of paragraph B16, wherein the at least one torsion link assembly is configured to prevent rotation of the second shock strut relative to the first shock strut.

B18. The aircraft of paragraph B1, wherein the first shock strut and the second shock strut are configured so as to cooperate with each other to absorb landing energy.

B19. The aircraft of paragraph B1, wherein the first shock strut and the second shock strut are configured so as to cooperate with each other to extend the levered landing gear.

B20. The aircraft of paragraph B1, wherein the second shock strut comprises:
a metering pin coupled to a mounting surface of a piston of the second shock strut; and
an orifice plate that cooperates with the metering pin to meter an amount of fluid flow as the second shock strut is compressed.

B21. The aircraft of paragraph B20, wherein the metering pin includes a first end proximate the mounting surface of the piston, a second end longitudinally separated from the first end, and flutes longitudinally arranged on the metering pin between the first end and the second end, the flutes having a varying depth so that a fluid flow through the flutes is greater at the second end than fluid flow through the flutes at the first end.

B22. The aircraft of paragraph B1, wherein the second shock strut includes a strut cartridge and a piston that reciprocates within the strut cartridge, the piston having a first end including a connecting link mount and a second end, longitudinally spaced from the first end.

B23. The aircraft of paragraph B22, wherein the piston further comprises a first bearing disposed adjacent the first end and a second bearing disposed adjacent the second end, the first bearing and the second bearing being disposed between the piston and the strut cartridge.

B24. The aircraft of paragraph B22, wherein the piston further comprises a scraper that interfaces with the strut cartridge, the scraper being configured to clean an interior surface of the strut cartridge as the piston moves within the strut cartridge.

B25. The aircraft of paragraph B1, wherein the first shock strut includes variably sized fluid passages configured to control a load applied to an outer cylinder of the first shock strut, where the inner cylinder forms a piston of the first shock strut.

B26. The aircraft of paragraph B1, wherein the second shock strut includes variably sized fluid passages configured to control a load applied to a piston of the second shock strut.

B27. The levered landing gear of paragraph B1, further comprising a second shock strut service fitting disposed on the first shock strut, and at least one fluid flow aperture extending through a wall of a strut cartridge of the second shock strut, wherein a space between an outer surface of the second shock strut and an interior surface of the first shock strut defines a fluid passage between the second shock strut service fitting and the at least one fluid flow aperture.

C1. A method of making a levered landing gear, the method comprising:
disposing a second shock strut concentrically with and/or within a first shock strut, along a longitudinal axis of the first shock strut, such that the first shock strut and the second shock strut extend along a common extension axis; and
coupling a truck lever to both the first shock strut and the second shock strut, such that the second shock strut pivots the truck lever relative to the first shock strut as the first shock strut and the second shock strut extend along the common extension axis.

C2. The method of paragraph C1, wherein disposing second shock strut concentrically with and/or within a first shock strut includes positioning the first shock strut and the second shock strut relative to each other so that the first shock strut and the second shock strut cooperatively absorb landing energy.

C3. The method of paragraph C1, wherein disposing second shock strut concentrically with and/or within a first shock strut includes positioning the first shock strut and the second shock strut relative to each other so that the first shock strut and the second shock strut cooperatively extend the levered landing gear.

D1. A levered landing gear comprising:
a first shock strut having a first end and a second end;
a truck lever pivotally coupled to the second end of the first shock strut; and
a second shock strut disposed between the second end of the first shock strut and the truck lever, where the second shock strut has a first end and a second end, the first end of the second shock strut being coupled to the second end of the first shock strut and the second end of the second shock strut being coupled to the truck lever.

D2. The levered landing gear of paragraph D1, wherein the first shock strut includes an outer cylinder forming the first end of the first shock strut and an inner cylinder forming the second end of the first shock strut and being at least partially disposed within the outer cylinder, the outer cylinder being configured for coupling with a vehicle frame and the inner cylinder extends and retracts relative to the outer cylinder.

D3. The levered landing gear of paragraph D2, wherein the second shock strut is disposed at least partially within the inner cylinder.

D4. The levered landing gear of paragraph D2, wherein the second shock strut includes a piston that reciprocates within the inner cylinder.

D5. The levered landing gear of paragraph D4, further comprising a connecting link coupling the piston to the truck lever.

D6. The levered landing gear of paragraph D2, wherein the second shock strut includes an outer cylinder forming one of the first end and second end of the second shock strut and an inner cylinder forming the other of the first end and second end of the second shock strut, where the second shock strut is pivotally coupled to the inner cylinder of the first shock strut and is directly pivotally coupled to the truck lever.

D7. The levered landing gear of paragraph D2, wherein the inner cylinder includes an inner chamber, the inner chamber being bifurcated into a first shock strut fluid compression chamber and a second shock strut fluid compression chamber, where fluid within the first shock strut compression chamber extends the inner cylinder relative to the outer cylinder and fluid within the second shock strut fluid compression chamber extends the second shock strut relative to the inner cylinder.

D8. The levered landing gear of paragraph D7, wherein the second shock strut comprises a strut cartridge inserted into the inner chamber, where the strut cartridge bifurcates the inner chamber and defines the second shock strut fluid compression chamber.

D9. The levered landing gear of paragraph D8, wherein the strut cartridge comprises an elongated tube and an end cap, the end cap defines a strut bulkhead of the first shock strut.

D10. The levered landing gear of paragraph D9, wherein the strut bulkhead of the first shock strut includes a metering pin of the first shock strut.

D11. The levered landing gear of paragraph D10, wherein the metering pin of the first shock strut includes a first end proximate the strut bulkhead, a distal end longitudinally separated from the first end, and flutes longitudinally arranged on the metering pin between the first end and the second end, the flutes having a varying depth so that a fluid flow through the flutes is greater at the second end than fluid flow through the flutes at the first end.

D12. The levered landing gear of paragraph D2, further comprising a stop member coupled to the inner cylinder, the stop member including a stop surface configured to interface with the truck lever such that reaction forces bypass the second shock strut.

D13. The levered landing gear of paragraph D1, wherein
the truck lever includes a first end and a second end, the first end being pivotally coupled to the first shock strut at a truck lever pivot axis and the second end includes a wheel rotation axis; and
a connecting link having a connecting link first end and a connecting link second end opposite the connecting link first end, the connecting link first end being coupled to the truck lever between the truck lever pivot axis and the wheel rotation axis, and the connecting link second end being coupled to the second shock strut.

D14. The levered landing gear of paragraph D13, wherein the connecting link is pivotally coupled to both the second shock strut and the truck lever.

D15. The levered landing gear of paragraph D13, wherein the truck lever includes but one wheel rotation axis.

D16. The levered landing gear of paragraph D1, wherein an extension length of the levered landing gear is defined by a combination of an extension length of the first shock strut and an extension length of the second shock strut.

D17. The levered landing gear of paragraph D1, further comprising at least one torsion link coupling an inner cylinder and outer cylinder of the first shock strut.

D18. The levered landing gear of paragraph D17, wherein the at least one torsion link is configured to prevent rotation of the second shock strut relative to the first shock strut.

D19. The levered landing gear of paragraph D1, wherein the first shock strut and the second shock strut are configured so as to cooperate with each other to absorb landing energy.

D20. The levered landing gear of paragraph D1, wherein the first shock strut and the second shock strut are configured so as to cooperate with each other to extend the levered landing gear.

D21. The levered landing gear of paragraph D1, wherein the second shock strut comprises:
a metering pin coupled to a mounting surface of a piston of the second shock strut; and
an orifice plate that cooperates with the metering pin to meter an amount of fluid flow as the second shock strut is compressed.

D22. The levered landing gear of paragraph D21, wherein the metering pin includes a first end proximate the mounting surface of the piston, a distal end longitudinally separated from the first end, and flutes longitudinally arranged on the metering pin between the first end and the second end, the flutes having a varying depth so that a fluid flow through the flutes is greater at the second end than fluid flow through the flutes at the first end.

D23. The levered landing gear of paragraph D1, wherein the second shock strut includes a strut cartridge and a piston that reciprocates within the strut cartridge, the piston having a first end including a connecting link mount and a second end, longitudinally spaced from the first end.

D24. The levered landing gear of paragraph D23, wherein the piston further comprises a first bearing disposed adjacent the first end and a second bearing disposed adjacent the second end, the first bearing and the second bearing being disposed between the piston and the strut cartridge.

D25. The levered landing gear of paragraph D23, wherein the piston further comprises a scraper that interfaces with the strut cartridge, the scraper being configured to clean an interior surface of the strut cartridge as the piston moves within the strut cartridge.

D26. The levered landing gear of paragraph D1, wherein the first shock strut includes variably sized oil passages configured to control a load applied to a piston of the first shock strut.

D27. The levered landing gear of paragraph D1, wherein the second shock strut includes variably sized oil passages configured to control a load applied to a piston of the second shock strut.

D28. The levered landing gear of paragraph D1, further comprising a second shock strut service fitting disposed on the first shock strut, and at least one fluid flow aperture extending through a wall of a strut cartridge of the second shock strut, wherein a space between an outer surface of the second shock strut and an interior surface of the first shock strut defines a fluid passage between the second shock strut fitting and the at least one fluid flow aperture.

D29. An aircraft comprising the levered landing gear of any one of paragraphs D1 to D28.

E1. A method of using a levered landing gear, the method comprising:

extending a first shock strut and a second shock strut along a common extension axis, wherein the second shock strut is disposed concentrically with and/or within the first shock strut along a longitudinal axis of the first shock strut; and pivoting a truck lever relative to the first shock strut as the first shock strut and the second shock strut extend along the common extension axis, where the truck lever is coupled to both the first shock strut and the second shock strut.

E2. The method of paragraph E1, wherein the first shock strut and the second shock strut cooperatively absorb landing energy.

E3. The method of paragraph E1, wherein the first shock strut and the second shock strut cooperatively extend the levered landing gear.

E4. The method of paragraph E1, further comprising metering an amount of fluid flow within the first shock strut as the first shock strut is extended and compressed with at least a metering pin of the first shock strut, where the metering pin includes flutes each having a variable depth.

E5. The method of paragraph E1, further comprising metering an amount of fluid flow within the second shock strut as the second shock strut is extended and compressed with at least a metering pin of the second shock strut, where the metering pin includes flutes each having a variable depth.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 8, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. A levered landing gear comprising:
   a first shock strut having a first end, a second end, and a first shock strut fluid compression chamber;
   a truck lever pivotally coupled to the second end of the first shock strut; and
   a second shock strut disposed between the second end of the first shock strut and the truck lever, where the second shock strut has a first end, a second end, and a second shock strut fluid compression chamber, wherein:
   the second shock strut fluid compression chamber and the first shock strut compression chamber are isolated from each other by a bulkhead such that the first shock strut fluid compression chamber and the second shock strut fluid compression chamber are serially located on opposite sides of the bulkhead, and the first end of the second shock strut is coupled to the second end of the first shock strut and the second end of the second shock strut is coupled to the truck lever.

2. The levered landing gear of claim 1, wherein:
   the truck lever includes a first end and a second end, the first end being pivotally coupled to the first shock strut at a truck lever pivot axis and the second end includes a wheel rotation axis; and
   a connecting link having a connecting link first end and a connecting link second end opposite the connecting link first end, the connecting link first end being coupled to the truck lever between the truck lever pivot axis and the wheel rotation axis, and the connecting link second end being coupled to the second shock strut.

3. The levered landing gear of claim 2, wherein the connecting link is pivotally coupled to both the second shock strut and the truck lever.

4. The levered landing gear of claim 1, wherein the first shock strut includes an outer cylinder forming the first end of the first shock strut and an inner cylinder forming the second end of the first shock strut and being at least partially disposed within the outer cylinder, the outer cylinder being configured for coupling with a vehicle frame and the inner cylinder extends and retracts relative to the outer cylinder.

5. The levered landing gear of claim 4, wherein the second shock strut is disposed at least partially within the inner cylinder.

6. The levered landing gear of claim 4, wherein the second shock strut includes a piston that reciprocates within the inner cylinder.

7. The levered landing gear of claim 4, wherein the second shock strut includes an outer cylinder forming one of the first end and second end of the second shock strut and an inner cylinder forming the other of the first end and second end of the second shock strut, where the second shock strut is pivotally coupled to the inner cylinder of the first shock strut and is directly pivotally coupled to the truck lever.

8. The levered landing gear of claim 4, further comprising a stop member coupled to the inner cylinder, the stop member including a stop surface configured to interface with the truck lever such that reaction forces bypass the second shock strut.

9. The levered landing gear of claim 4, wherein the inner cylinder includes an inner chamber, the inner chamber being bifurcated into the first shock strut fluid compression chamber and the second shock strut fluid compression chamber, where fluid within the first shock strut compression chamber extends the inner cylinder relative to the outer cylinder and fluid within the second shock strut fluid compression chamber extends the second shock strut relative to the inner cylinder.

10. The levered landing gear of claim 9, wherein the second shock strut comprises a strut cartridge inserted into the inner chamber, where the strut cartridge bifurcates the inner chamber and defines the second shock strut fluid compression chamber.

11. An aircraft comprising:
    a vehicle frame; and
    a levered landing gear coupled to the vehicle frame, the levered landing gear including:
    a first shock strut having a first end, a second end, and a first shock strut fluid compression chamber;
    a truck lever pivotally coupled to the second end of the first shock strut; and
    a second shock strut disposed between the second end of the first shock strut and the truck lever, where the second shock strut has a first end, a second end, and a second shock strut fluid compression chamber, wherein:

the second shock strut fluid compression chamber and the first shock strut compression chamber are isolated from each other by a bulkhead such that the first shock strut fluid compression chamber and the second shock strut fluid compression chamber are serially located on opposite sides of the bulkhead, and the first end of the second shock strut is coupled to the second end of the first shock strut and the second end of the second shock strut is coupled to the truck lever.

12. The aircraft of claim 11, wherein:

the truck lever includes a first end and a second end, the first end being pivotally coupled to the first shock strut at a truck lever pivot axis and the second end includes a wheel rotation axis; and a connecting link having a connecting link first end and a connecting link second end opposite the connecting link first end, the connecting link first end being coupled to the truck lever between the truck lever pivot axis and the wheel rotation axis, and the connecting link second end being coupled to the second shock strut.

13. The aircraft of claim 11, wherein the first shock strut includes an outer cylinder forming the first end of the first shock strut and an inner cylinder forming the second end of the first shock strut and being at least partially disposed within the outer cylinder, the outer cylinder being configured for coupling with a vehicle frame and the inner cylinder extends and retracts relative to the outer cylinder.

14. The aircraft of claim 13, wherein the second shock strut is disposed at least partially within the inner cylinder.

15. The aircraft of claim 13, wherein the second shock strut includes an outer cylinder forming one of the first end and second end of the second shock strut and an inner cylinder forming the other of the first end and second end of the second shock strut, where the second shock strut is pivotally coupled to the inner cylinder of the first shock strut and is directly pivotally coupled to the truck lever.

16. The aircraft of claim 13, wherein the inner cylinder includes an inner chamber, the inner chamber being bifurcated into the first shock strut fluid compression chamber and the second shock strut fluid compression chamber, where fluid within the first shock strut compression chamber extends the inner cylinder relative to the outer cylinder and fluid within the second shock strut fluid compression chamber extends the second shock strut relative to the inner cylinder.

17. The aircraft of claim 13, further comprising a stop member coupled to the inner cylinder, the stop member including a stop surface configured to interface with the truck lever such that reaction forces bypass the second shock strut.

18. A method of using a levered landing gear, the method comprising:

extending a first shock strut and a second shock strut along respective extension axes, wherein the second shock strut is pivotally coupled to the first shock strut so that the first shock strut and second shock strut and the respective extension axes are serially arranged relative to one another and a fluid compression chamber of the first shock strut is serially arranged relative to and isolated from a fluid compression chamber of the second shock strut; and pivoting a truck lever relative to the first shock strut as the first shock strut and the second shock strut serially extend along the respective extension axis, where the truck lever is coupled to both the first shock strut and the second shock strut.

19. The method of claim 18, wherein the second shock strut is disposed at least partially within an inner cylinder of the first shock strut and pivots relative to the first shock strut within the inner cylinder.

20. The method of claim 19, wherein the second shock strut is pivotally coupled to the inner cylinder of the first shock strut and is directly pivotally coupled to the truck lever.

* * * * *